(12) United States Patent
Matoba

(10) Patent No.: US 8,948,050 B2
(45) Date of Patent: Feb. 3, 2015

(54) DISTRIBUTION SYSTEM, DISTRIBUTION METHOD, AND MEMORY MEDIUM THEREOF

(75) Inventor: Kazumine Matoba, Shinjuku (JP)

(73) Assignee: Fujitsu Limited, Kawasaki (JP)

( * ) Notice: Subject to any disclaimer, the term of this patent is extended or adjusted under 35 U.S.C. 154(b) by 226 days.

(21) Appl. No.: 13/592,669

(22) Filed: Aug. 23, 2012

(65) Prior Publication Data

US 2013/0064135 A1 Mar. 14, 2013

(30) Foreign Application Priority Data

Sep. 8, 2011 (JP) ................................ 2011-195616

(51) Int. Cl.
*H04L 29/08* (2006.01)
(52) U.S. Cl.
CPC .......... *H04L 67/1074* (2013.01); *H04L 67/125* (2013.01)
USPC ........... 370/254; 370/256; 370/396; 370/408; 709/205; 709/228
(58) Field of Classification Search
CPC ............... H04L 12/16–12/28; H04L 12/1845; H04L 12/2469; H04L 12/287; H04L 67/125; H04L 67/1074; H04L 45/00; H04L 45/02; H04L 45/16; H04L 45/48; H04L 41/12; H04L 12/462; H04L 12/185; H04L 49/90; H04W 4/02
USPC ...................... 370/254, 395.21, 395.5, 395.7, 370/396–398, 400–401, 429; 709/201, 200, 709/204–205, 217–219, 223–228, 230–231, 709/243–244, 250, 238, 242
See application file for complete search history.

(56) References Cited

U.S. PATENT DOCUMENTS

| 7,293,109 | B2 | 11/2007 | Ott et al. |
| 7,779,149 | B2 | 8/2010 | Doi et al. |
| 8,612,621 | B2* | 12/2013 | Wang et al. .................... 709/231 |
| 2003/0079027 | A1* | 4/2003 | Slocombe et al. ............ 709/229 |
| 2004/0225612 | A1* | 11/2004 | Shimojima et al. ............. 705/57 |
| 2005/0076104 | A1* | 4/2005 | Liskov et al. .................. 709/223 |

(Continued)

FOREIGN PATENT DOCUMENTS

| JP | 2002-290952 A | 10/2002 |
| JP | 2004-32114 A | 1/2004 |

(Continued)

*Primary Examiner* — Charles C Jiang
*Assistant Examiner* — Mohamed Kamara
(74) *Attorney, Agent, or Firm* — Fujitsu Patent Center

(57) ABSTRACT

The control node, on the basis of the connection information between the distribution nodes and the load information of the distribution nodes, determines a distribution node of the distribution destination to which one of a plurality of distribution nodes subsequently distributes the data, and the data type which is distributed to the distribution node of the distribution destination. The control node distributes node information which specifies the distribution node of the determined distribution destination and type information which specifies the determined data type. The distribution node receives the node information and the type information distributed from the control node. The distribution node, when it receives the data distributed from the other distribution nodes, selects the data of the type specified by the type information from the received data. The distribution node transmits the data of the selected type to the distribution node specified by the node information.

18 Claims, 51 Drawing Sheets

(56) References Cited

U.S. PATENT DOCUMENTS

2007/0198629 A1    8/2007   Ganguly
2009/0113057 A1*   4/2009   Van der Merwe et al. .... 709/227
2010/0095222 A1*   4/2010   Tevelev et al. ................ 715/748
2010/0217869 A1*   8/2010   Esteban et al. ................ 709/226
2010/0263013 A1*  10/2010   Asakura ........................ 725/116

FOREIGN PATENT DOCUMENTS

| JP | 2005-20588 A  | 1/2005 |
| JP | 2005-506744 A | 3/2005 |
| JP | 2007-234014 A | 9/2007 |

* cited by examiner

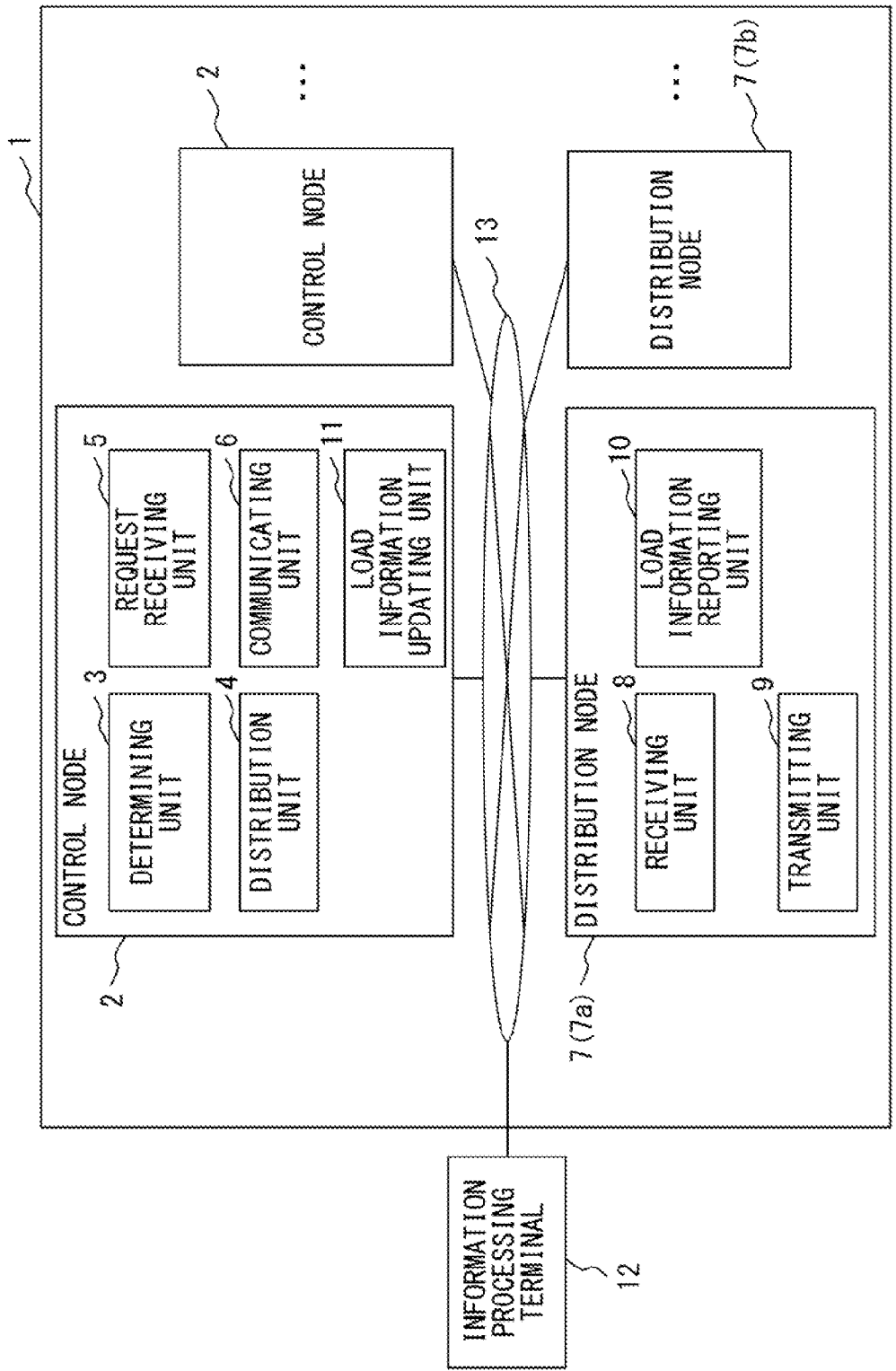

```
29-1 ── <?xml version="1.0"?>
29-2 ── <topic = "topic1">                                    ── 29
29-3 ──   <time>2010/12/22 15:23:00</time>
          ┌ <data type="D1">
29-41 ──┤    <value>25.5</value>
          └ </data>
          ┌ <data type="D2">
29-42 ──┤    <value>49</value>
          └ </data>
          ┌ <data type="D3">
29-43 ──┤    <value>0</value>
          └ </data>
          ┌ <data type="D4">
29-44 ──┤    <value>5</value>
          └ </data>
        </topic>
```

F I G. 3

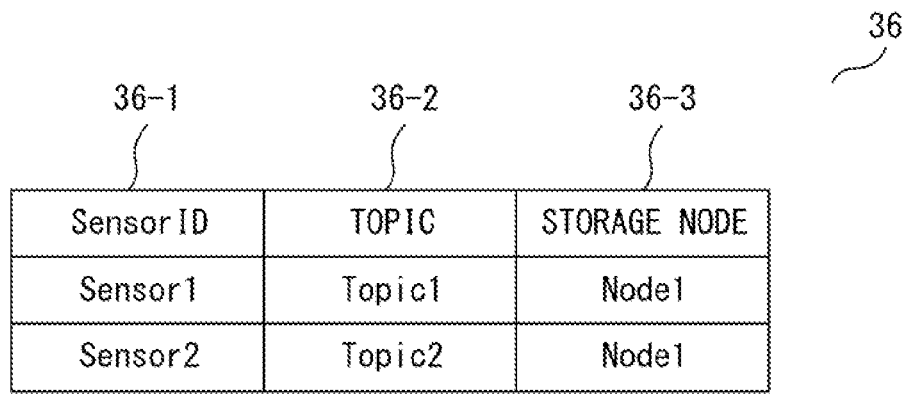
F I G. 8

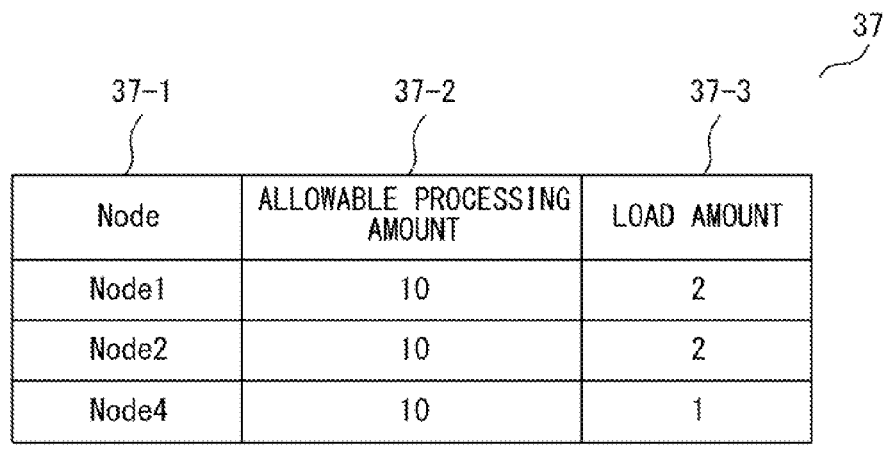
F I G. 9

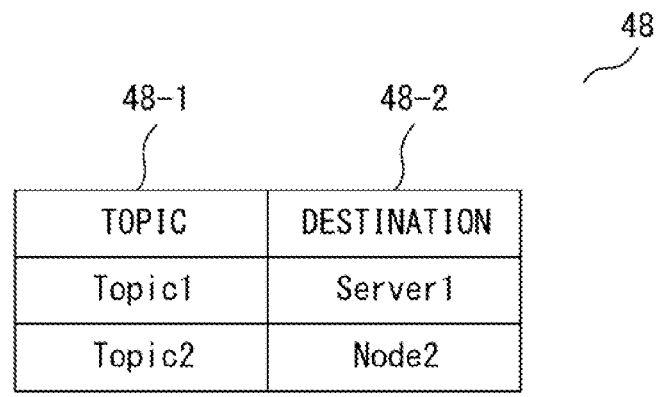
F I G. 1 2

| TOPIC | RELAY DESTINATION | DATA TYPE |
|---|---|---|
| Topic1 | Server1 | D1, D2, D3, D4 |
| Topic1 | Node2 | D1, D2 |

FIG. 13

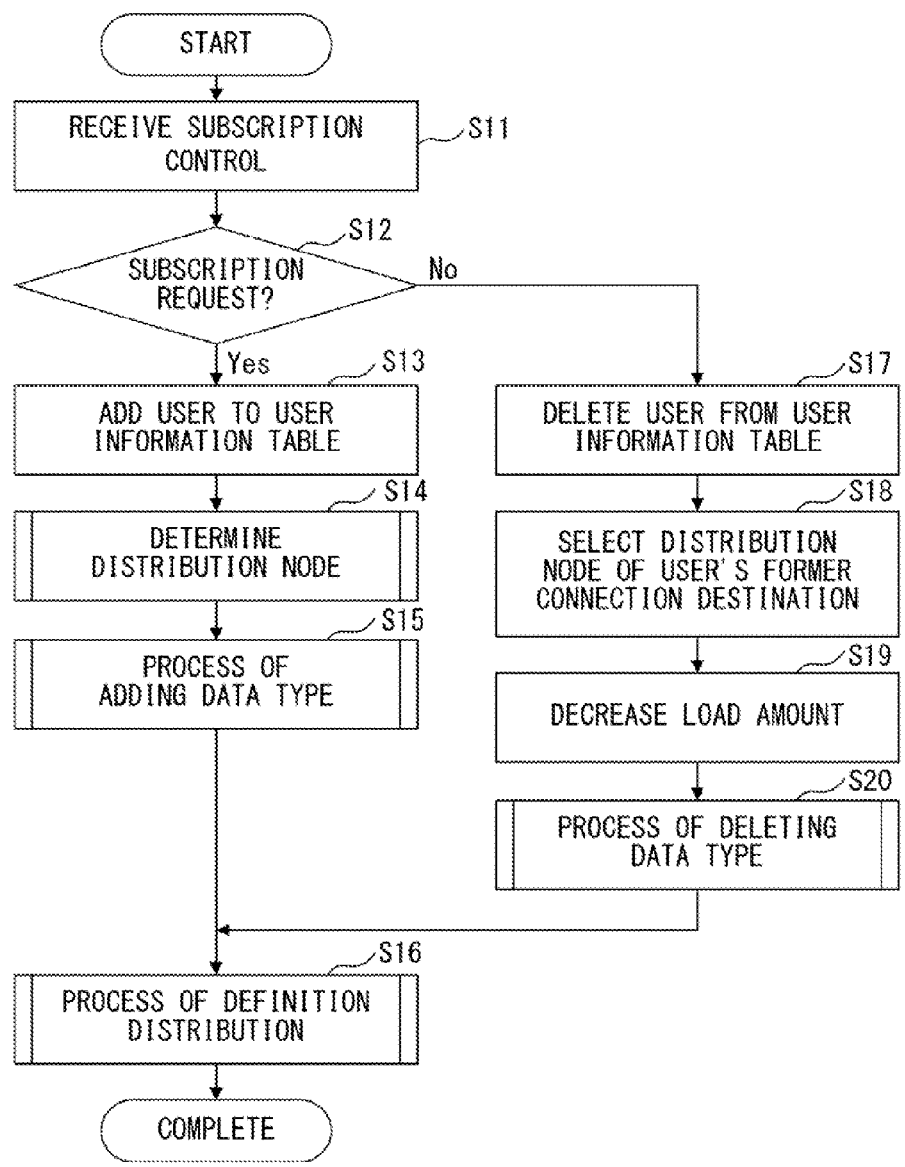
F I G. 1 4

| 51-1 | 51-2 |
|---|---|
| TOPIC | DISTRIBUTION TIME |
| Topic1 | 2010.11.27 12:20:13:23 |

| UserID 38-1 | TOPIC 38-2 | DATA TYPE 38-3 | STORAGE NODE 38-4 | UPDATE TIME 38-5 |
|---|---|---|---|---|
| User1 | Topic1 | D1, D2 | Node2 | 2010.11.27 11:10:10:24 |
| User2 | Topic1 | D1 | Node4 | 2010.11.27 11:10:10:24 |
| Server1 | Topic1 | D1, D2, D3, D4 | Node1 | 2010.11.27 13:05:45:10 |

| Link | From | To | TOPIC | DATA TYPE | UPDATE TIME |
|---|---|---|---|---|---|
| L1 | Node1 | Node2 | Topic1 | D1, D2 | 2010.11.27 13:05:45:10 |
| L2 | Node2 | Node3 | Topic1 | — | 2010.11.27 11:10:10:24 |
| L3 | Node2 | Node4 | Topic1 | D1 | 2010.11.27 11:10:10:24 |

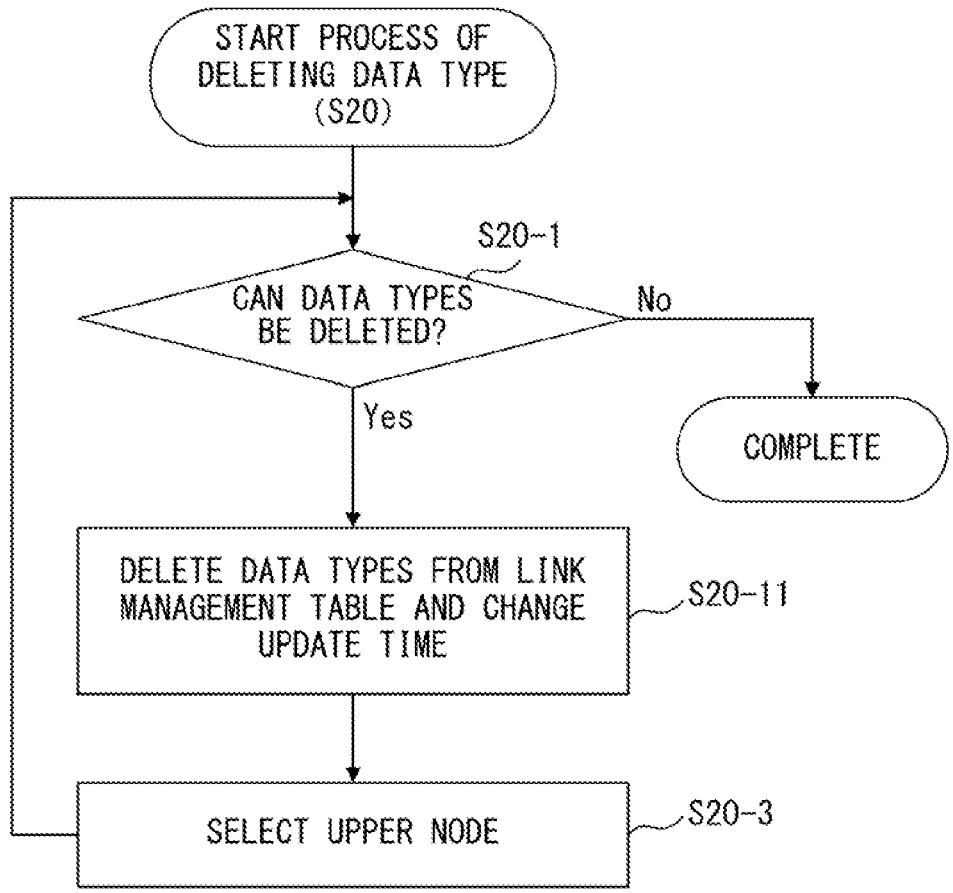
F I G. 2 6

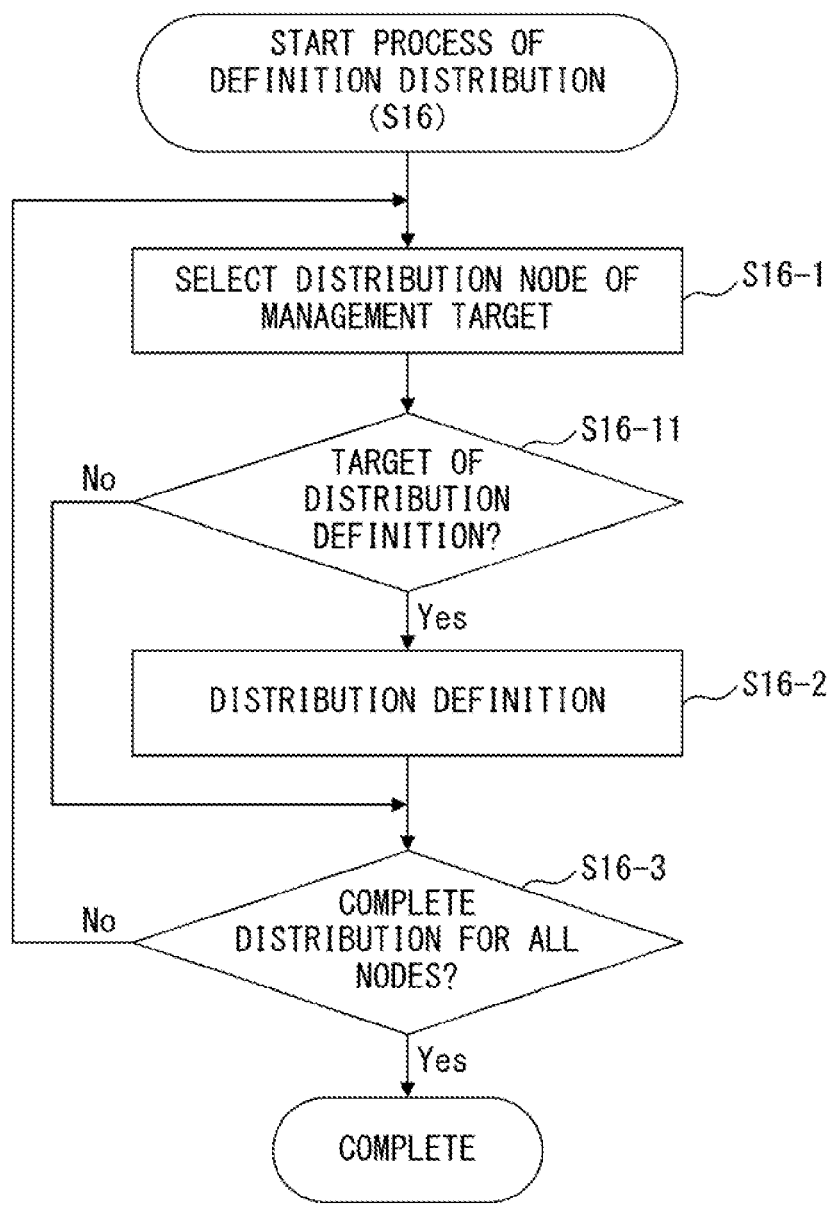
F I G. 2 7

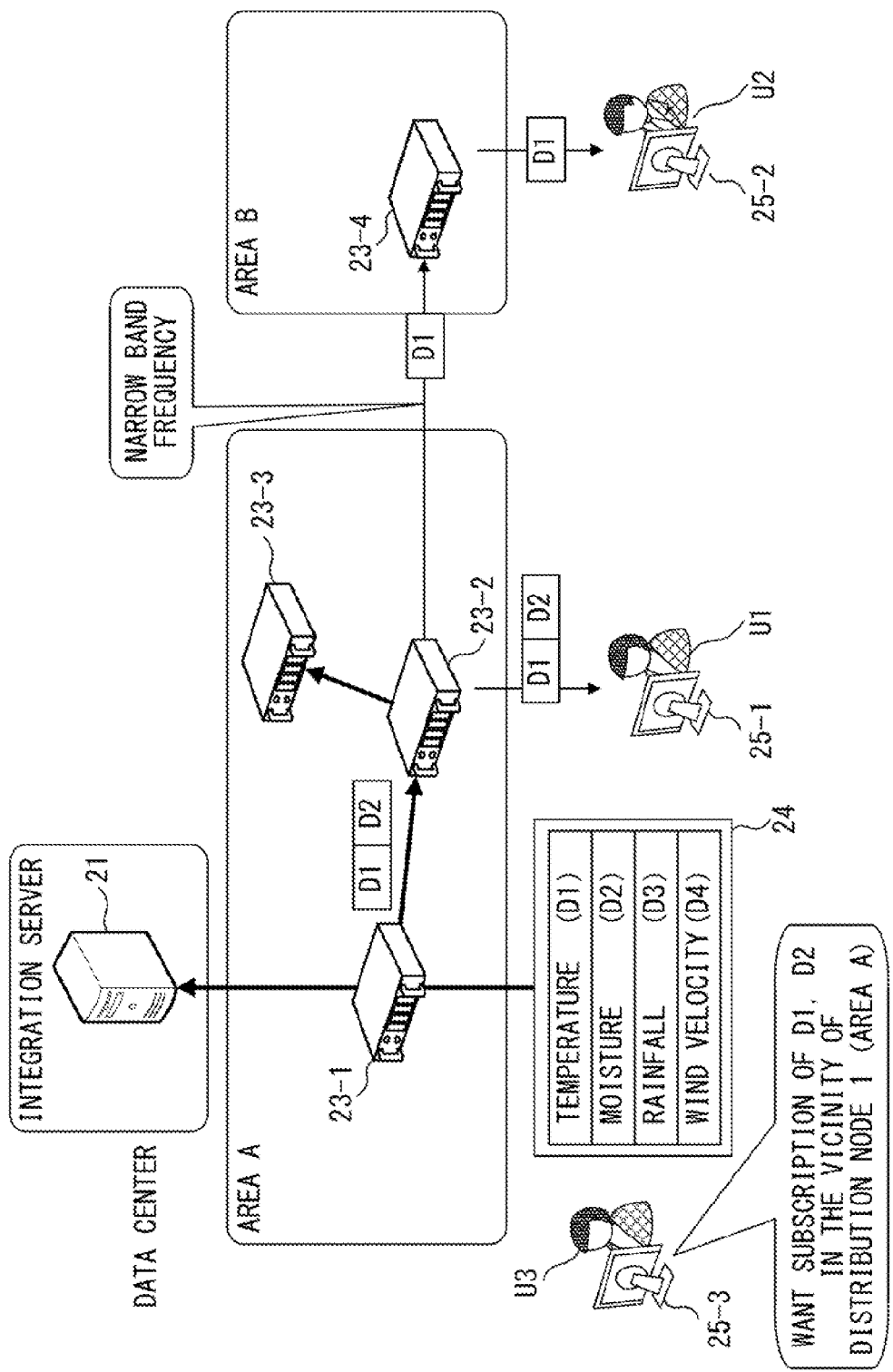
F I G. 28

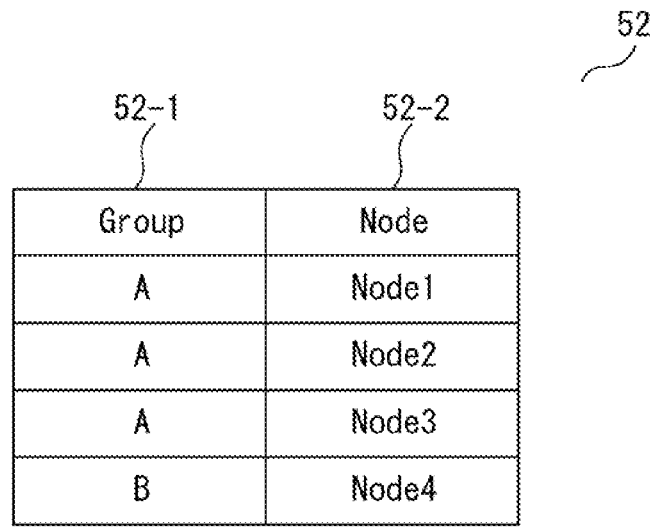
F I G. 30

| Node | ALLOWABLE CPU UTILIZATION RATE | CURRENT CPU UTILIZATION RATE |
|---|---|---|
| Node1 | 90% | 20% |
| Node2 | 90% | 20% |
| Node4 | 90% | 10% |

FIG. 34

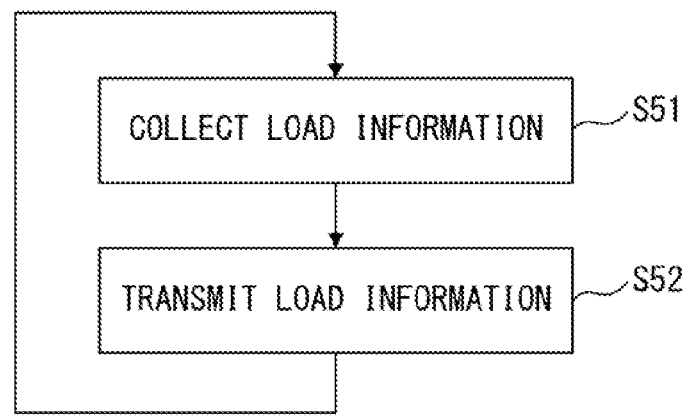
F I G. 35

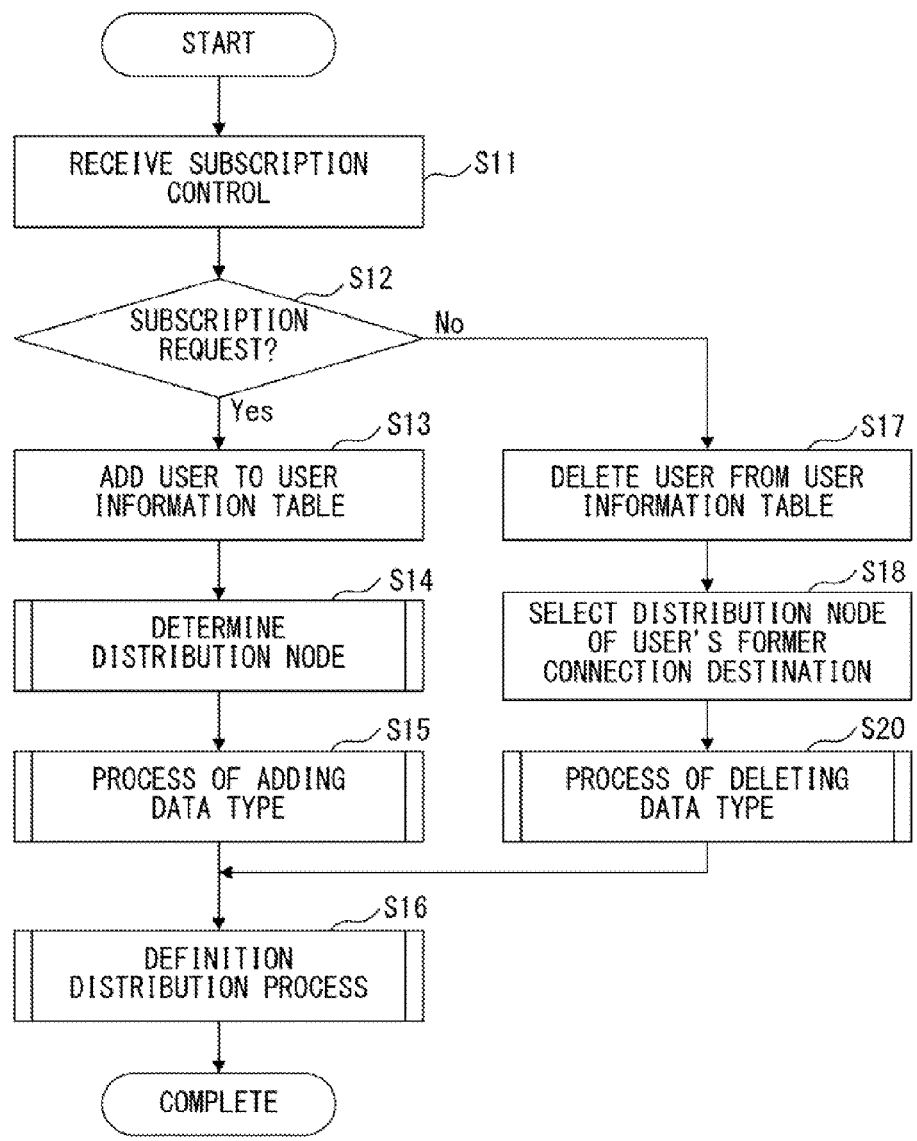
F I G. 3 7

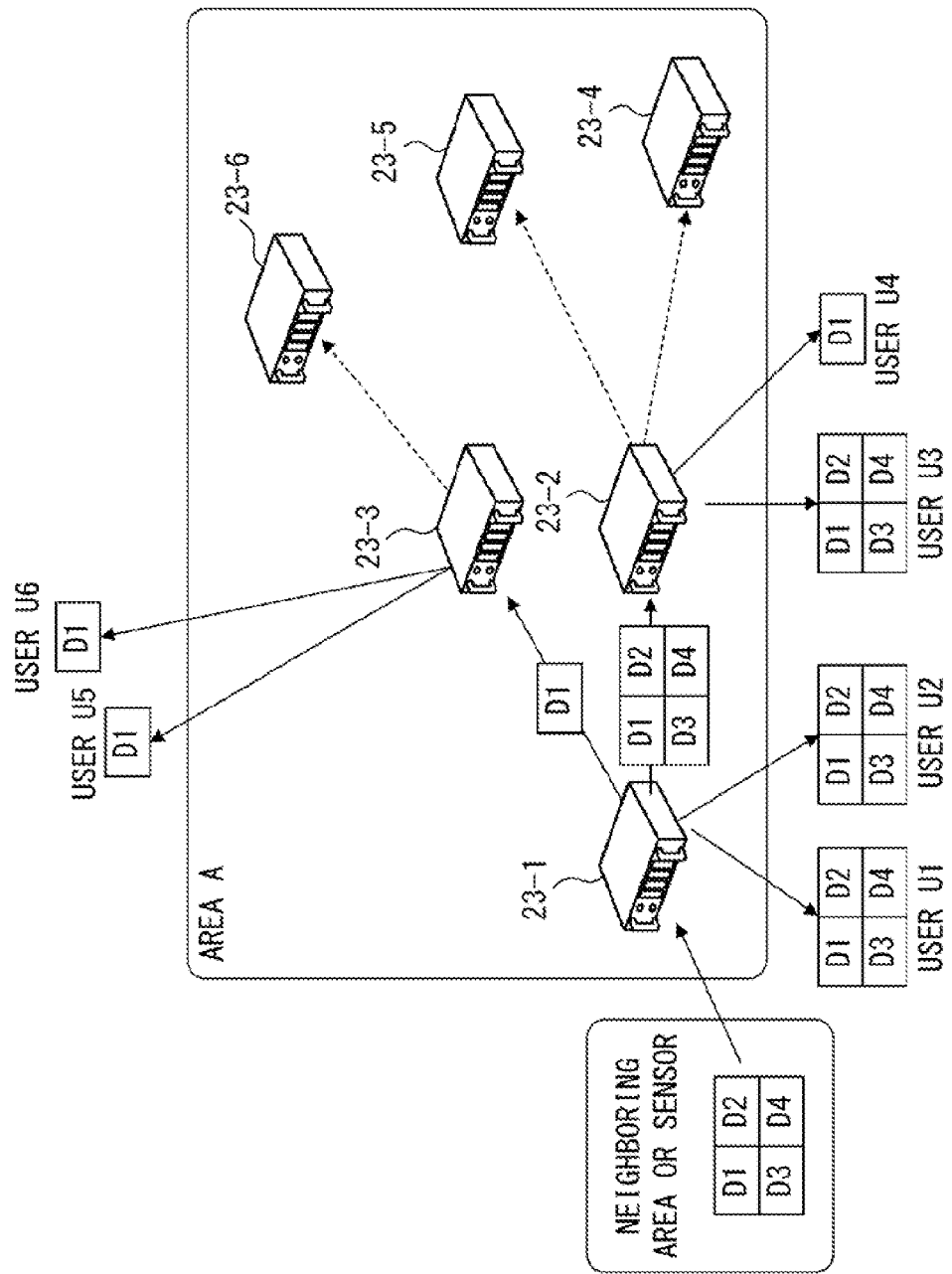

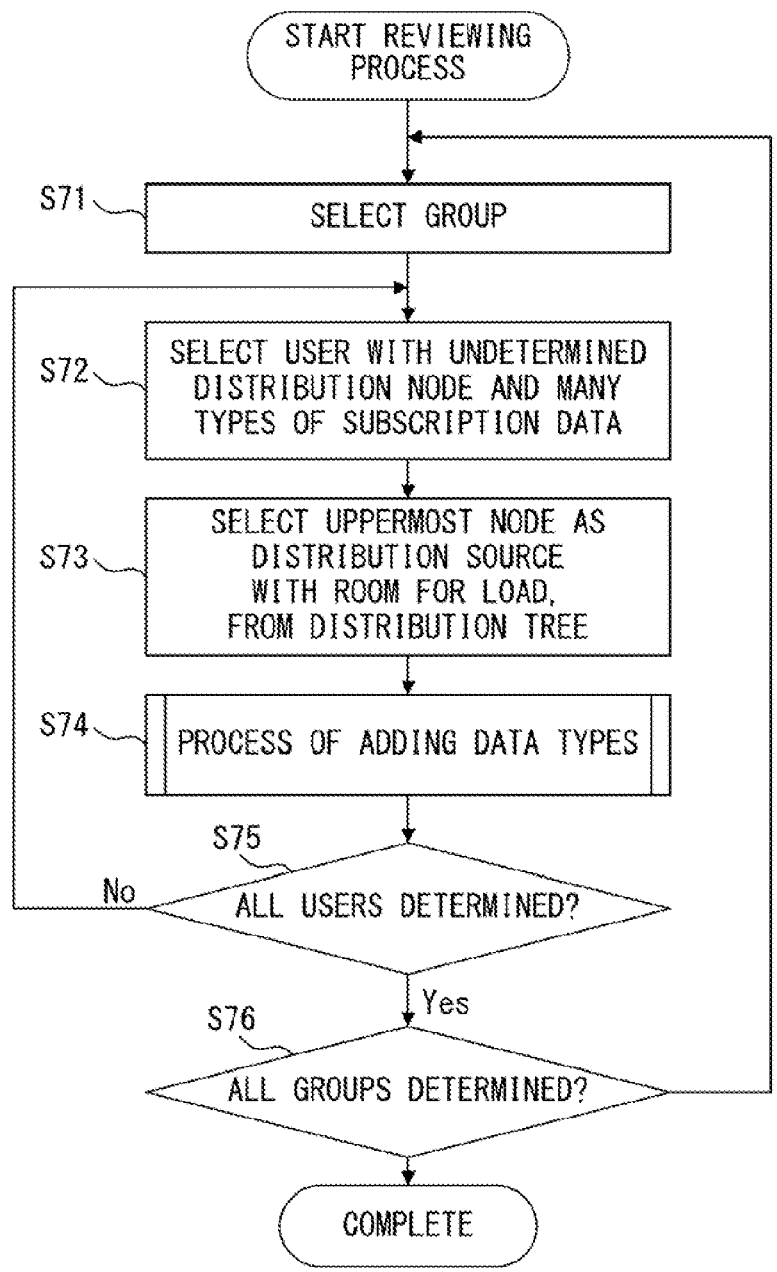
F I G. 4 1

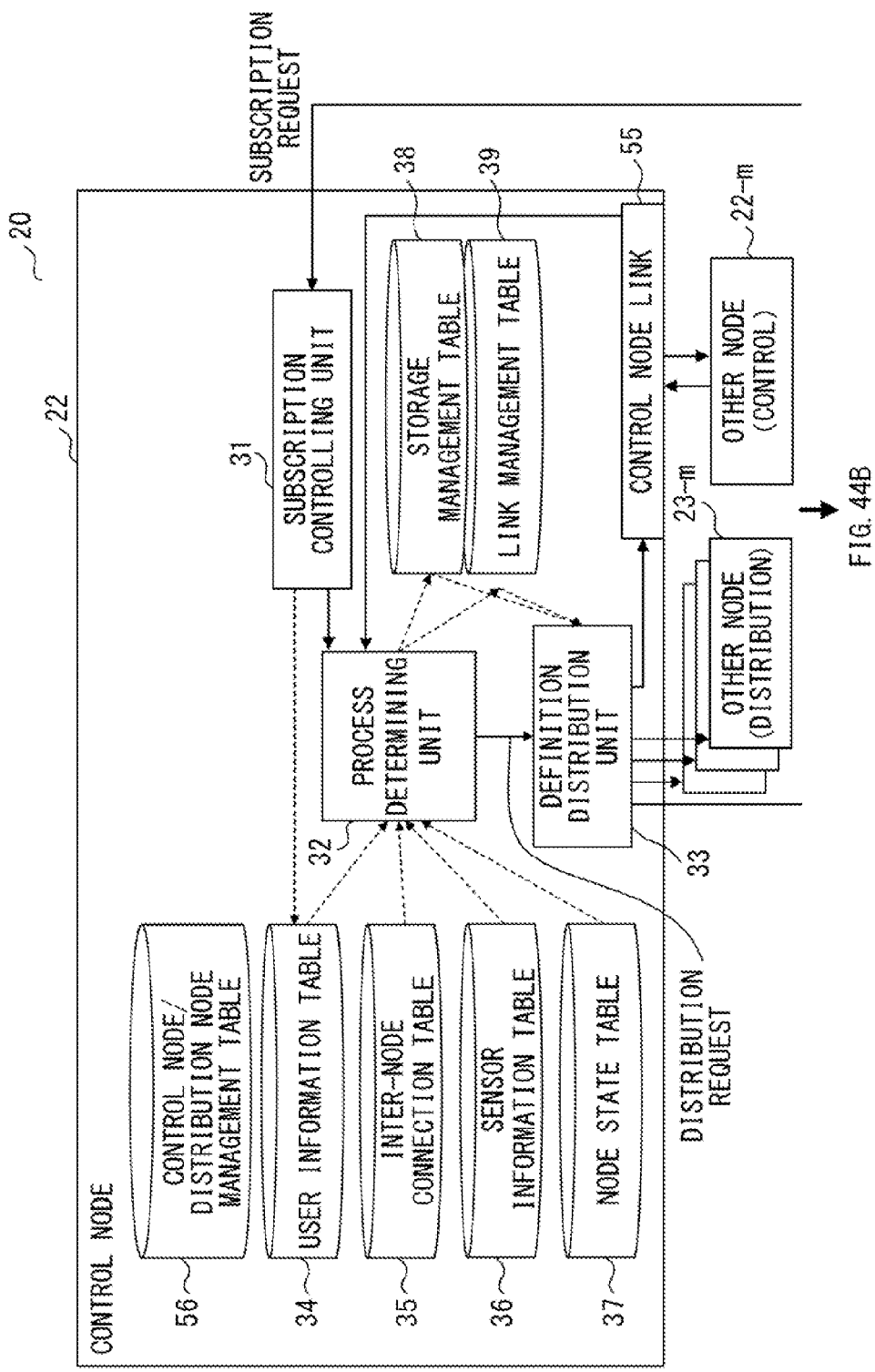
F I G. 44A

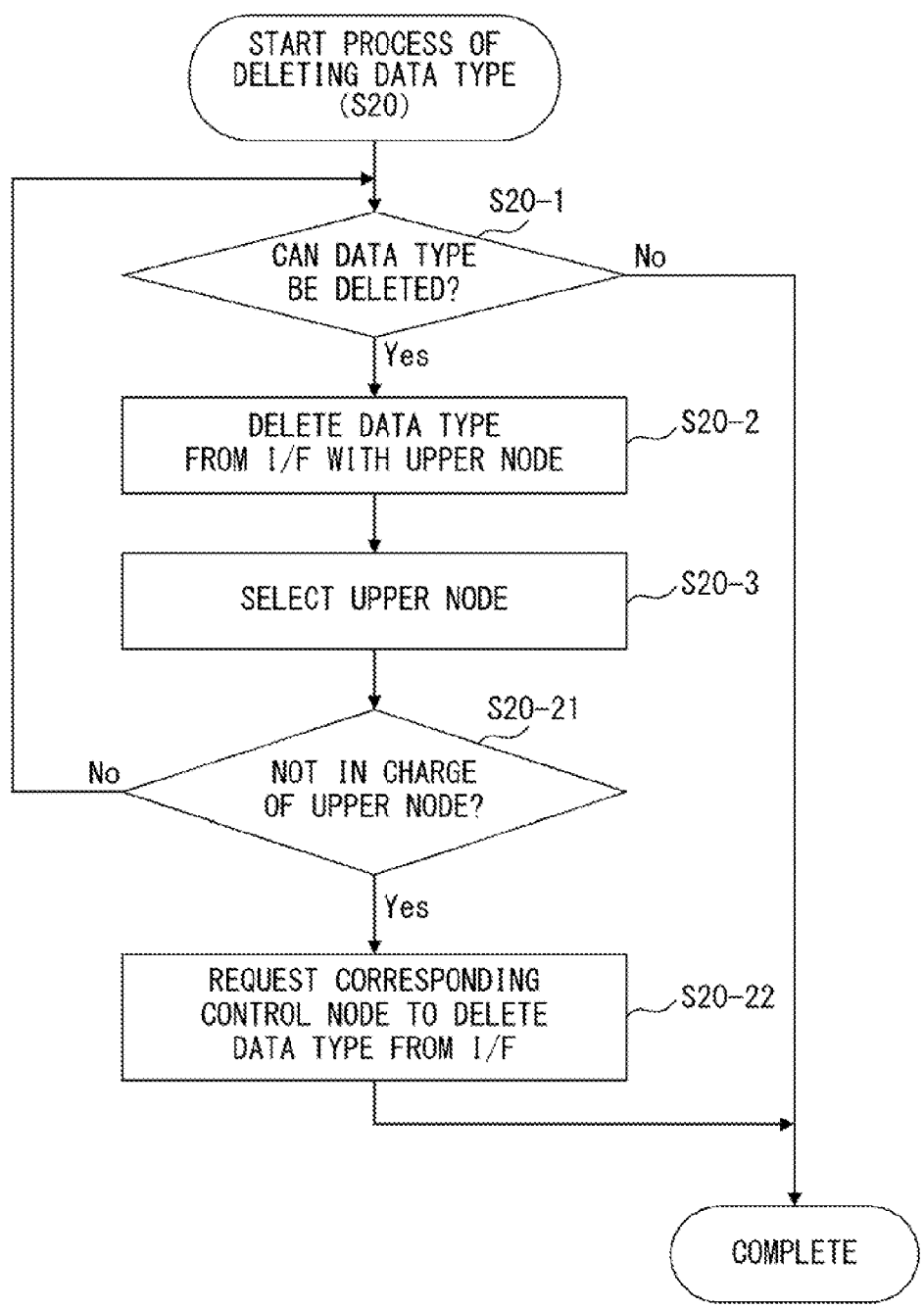
F I G. 4 7

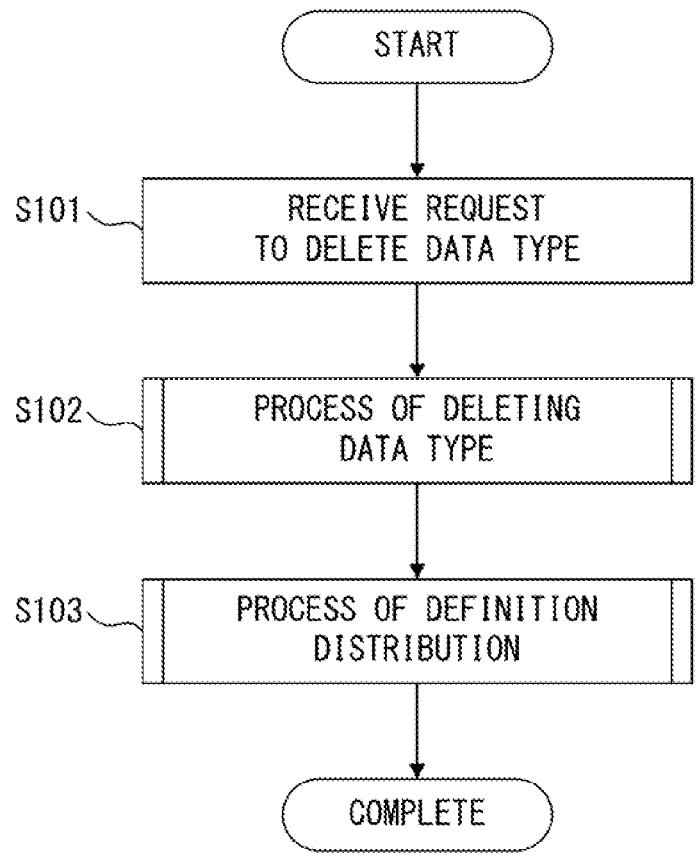
F I G. 4 9

DISTRIBUTION SYSTEM, DISTRIBUTION METHOD, AND MEMORY MEDIUM THEREOF

CROSS-REFERENCE TO RELATED APPLICATION

This application is based upon and claims the benefit of priority of the prior Japanese Patent Application No. 2011-195616, filed on Sep. 8, 2011, the entire contents of which are incorporated herein by reference.

FIELD

The embodiments explained hereinafter relate to a distribution system which distributes information using a distribution node.

BACKGROUND

A distribution system exists which collects and distributes real-time field information, such as, for example, sensor information (earthquakes, rain, etc.) from around the location of a user. In such a distribution system, in many cases, an information provider does not know beforehand who will use the information. Therefore, it is necessary for the user to be able to join the distribution system any time when he wants to refer to data and to be able to change the type of sensor information to be distributed at will.

As a system for referring to such sensor information, a Publication/Subscription communication model is utilized. The Publication/Subscription communication model is a system by which a message is distributed at a timing at which an event occurs in a corresponding topic (for example, "when a window of the home opens", etc) when a subscription is registered beforehand with respect to the topic (for example, "home", etc). With this, a transmitter and a receiver do not need to be conscious of who and where the other party is, and the receiver can receive only the messages that he wants. With this Publication/Subscription system, the subscription to a distribution process is available not only for a single user but also for a plurality of users simultaneously.

In addition, in order to inhibit increases in loads and power consumption of communication processing, the information provider is required to integrally deliver, to a certain degree, regularly obtained data.

Thus, when the Publication/Subscription system is used, an intermediary is required between a transmitter (sensor) wishing to transmit a plurality of data simultaneously and a receiver (user) wishing to receive only the necessary data. Therefore, the following technique can be considered.

As a first technique, such a method of integrating all the data in a server of a data center and then individually distributing only the data required for each user can be considered.

Further, as a second technique, multicast distribution by an IP Router as a distribution technique to a plurality of users can also be considered. The multicast distribution is a process of relaying in units of packets. When the multicast distribution is used, by distributing the data output from the sensor to all users as they are, the data can be collected and distributed by being dispersedly processed at plural nodes, thereby shortening a delay. In addition, a technique related to the above mentioned multicast distribution includes, for example, a technique related to MPLS (Multi-Protocol Label Switching).

Further, as a third technique, the following can be considered. A terminal receives streaming data from a stream server and requests to view the program to be viewed related to the streaming data. The stream server, before transmitting the streaming data to the terminal which requested viewing, caches common information of said program to be viewed to the common information data base and receives the viewing request for the same program to be viewed from other terminals. Then, the stream server, after transmitting the common information of the common information data base to said other terminals, also transmits the streaming data actually distributed from the stream server to the other terminals as well in addition to the terminal under transmission.

Further, as a fourth technique, the following can be considered. A management server generates instructing information for preparing complex content on the basis of the content of the complex content to be prepared. A piece of intermediary equipment instructs a content server to eject a content part required for preparing the complex content in accordance with the instructing information. Each content server, by corresponding to the content part instructed to be ejected, acquires the complex contents elements whose encoding format is converted for a mobile terminal and responds to the intermediary equipment. The intermediary equipment combines, in chronologic order, the complex contents elements that the contents server responded with on the basis of the instructing information from the management server and prepares them as complex contents for a mobile terminal. The management server distributes the prepared complex contents to the mobile terminal.

Patent Document 1: Japanese Laid-open Patent Publication No. 2004-32114

Patent Document 2: Japanese Laid-open Patent Publication No. 2002-290952

Patent Document 3: Japanese Laid-open Patent Publication No. 2005-20588

Patent Document 4: Japanese National Publication of International Patent Application No. 2005-506744

Patent Document 5: Japanese Laid-open Patent Publication No. 2007-234014

SUMMARY

According to one aspect of the present embodiment, in a distribution system, a plurality of distribution nodes and control nodes are connected via a network. The control node includes a memory and a processor. The processor of the control node, on the basis of connection information indicating a connection state between distribution nodes and load information in a distribution node, determines the distribution node of a distribution destination to which one of a plurality of distribution nodes distribute data subsequently and a data type distributed to the distribution node of the distribution destination. The processor of the control node distributes node information which specifies the determined distribution node of the distribution destination and the type information which specifies the determined data type to the distribution node.

The distribution node includes a memory and a processor. The processor of the distribution node receives the node information and the type information distributed from the control node. The processor of the distribution node, when it receives data distributed from other distribution nodes, selects the data of the type specified by the type information from the received data and transmits the selected type of data to the distribution node specified by the node information.

The object and the advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a functional block diagram of a distribution system in the present embodiment.

FIG. 3 illustrates one example of an XML message in the first embodiment.

FIG. 8 illustrates a configuration example of a sensor information table in the first embodiment.

FIG. 9 illustrates a configuration example of a node state table in the first embodiment.

FIG. 12 illustrates a configuration example of a relay definition table in the first embodiment.

FIG. 13 illustrates a configuration example of a process definition table in the first embodiment.

FIG. 14 illustrates a total flow example of a control node in the first embodiment.

FIG. 22 illustrates a configuration example of a distribution time management table in the second embodiment.

FIG. 23 illustrates a configuration example of a storage management table in the second embodiment.

FIG. 24 illustrates a configuration example of a link management table in the second embodiment.

FIG. 26 illustrates a flow of a process of deleting data of a control node in the second embodiment.

FIG. 27 illustrates a flow of a process of setting data performed by a control node in the second embodiment.

FIG. 28 illustrates a configuration example of a distribution system in the third embodiment.

FIG. 30 illustrates a configuration example of a node group table in the third embodiment.

FIG. 34 illustrates a configuration example of a node state table in the fourth embodiment.

FIG. 35 illustrates a flow of a process of a load state collecting unit 54 in the fourth embodiment.

FIG. 37 illustrates a total flow example of a control node in the fourth embodiment.

FIG. 40 explains a distribution state after applying the fifth embodiment.

FIG. 41 illustrates a flow of a process of reviewing the fifth embodiment.

FIGS. 44A and 44B illustrate a configuration block of a control node and a distribution node in the seventh embodiment.

FIG. 47 illustrates a flow of a process of deleting data of a control node in the seventh embodiment.

FIG. 49 illustrates a flow of a process of deleting data between a plurality of control nodes in the seventh embodiment.

DESCRIPTION OF EMBODIMENTS

Figure 2:
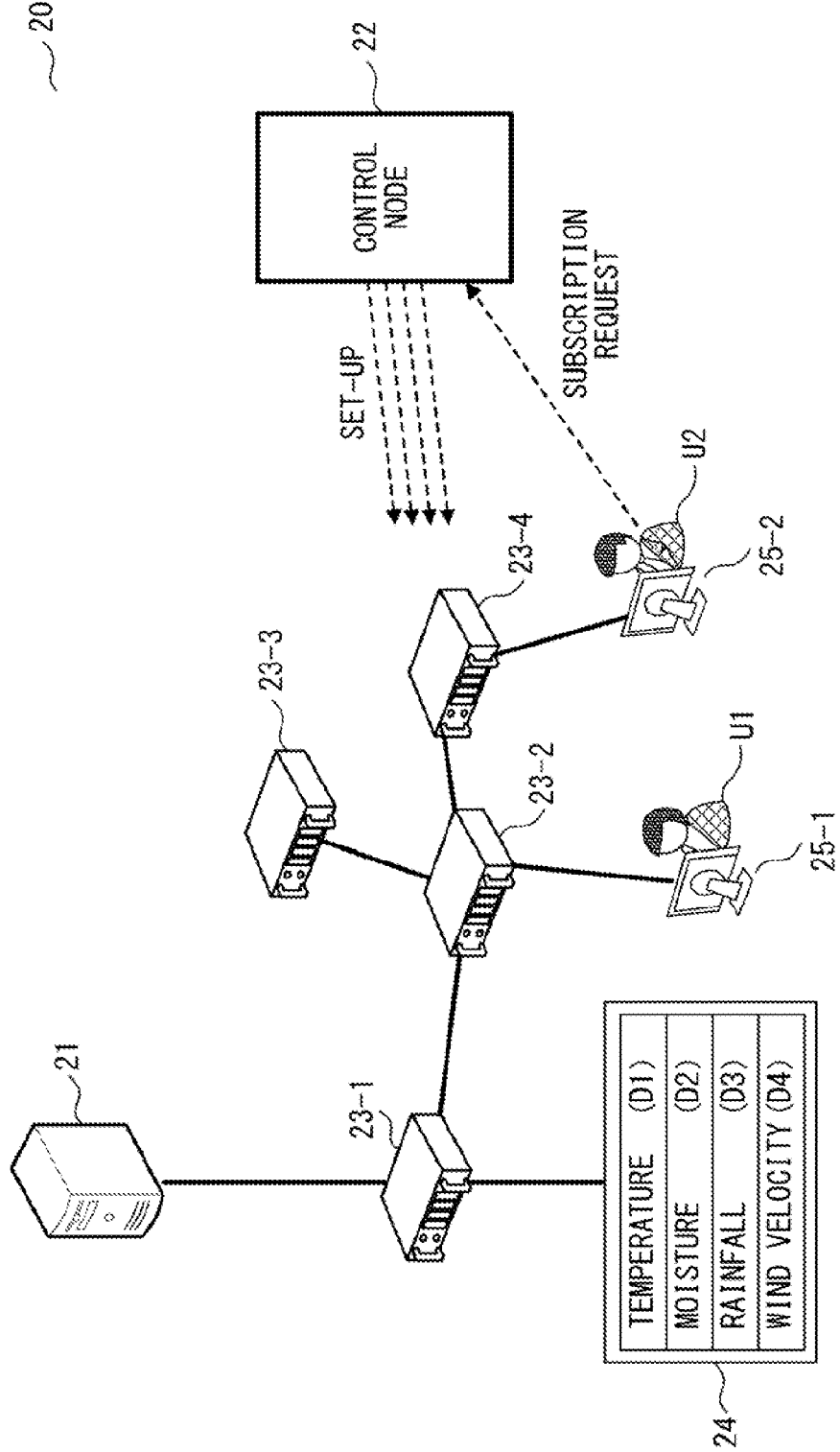
FIG. 2 illustrates a configuration example of a distribution system in the first embodiment.

With the above mentioned first technique, when all the data are integrated in a data center, load is concentrated at one spot, which may cause a bottleneck in a network band frequency and problems in server performance.

Further, with the above mentioned second technique, when multicast distribution is performed, the data acquired at the sensor are delivered to the user as they are, unprocessed, and therefore, each user is required to extract (process) the necessary data. Regarding networks, since data including unnecessary data are distributed to the destination, there is a concern that the band frequency of the network may be wasted in an undesirable manner.

Further, with the above mentioned third technique, with the presence of viewers of a streaming broadcast who joined in the middle of the broadcast, a relaying device does not request common information from the stream server but distributes the common information already cached to the viewers who joined in the middle of the broadcast. However, even with said third technique, since the data including unnecessary data are distributed to the destination, there is a concern that the band frequency of the network may be wasted in an undesirable manner.

Moreover, with the above mentioned fourth technique, regarding the load on a conversion device which used to perform a conversion process of segments, by the above mentioned process being performed on the contents server side, transmission quantity is reduced, the concentration of the processed load on the conversion device is prevented, and therefore, the processed load is dispersed. However, even with the above mentioned fourth technique, the load is concentrated on the contents server side and therefore there may be a bottleneck in the band frequency of the network and problems with server performance.

As mentioned above, since the data distributed between distribution nodes are distributed as they are, unprocessed, from the viewpoint of the users receiving said data at the end, unnecessary data are distributed to them as well, which, as a result, increases the network load.

Therefore, the embodiments provide a distribution technique capable of reducing the data amount transmitted between distribution nodes.

FIG. 1 illustrates the functional block diagram of the distribution system in the present embodiment. In the distribution system 1 of the present embodiment, a plurality of distribution nodes 7 and control nodes 2 are connected via a network 13. The control node 2 includes a determining unit 3 and a distribution unit 4.

The determining unit 3 determines the distribution node 7b of a distribution destination to which one distribution node 7a of a plurality of distribution nodes 7 distributes data subsequently and the data type distributed to the distribution node 7b at the distribution destination for each distribution node 7 on the basis of connection information and load information. The connection information is the information indicating the connection state between a plurality of distribution nodes 7. The load information is the information indicating the load state in each of the plurality of distribution nodes 7. An example of the determining unit 3 is a process determining unit 32.

The distribution unit 4 distributes node information which specifies the distribution node of the determined distribution destination and type information which specifies the type of the determined distribution data to a distribution node. An example of the distribution unit 4 is a definition distribution unit 33.

The distribution node 7 includes a receiving unit 8 and a transmitting unit 9. The receiving unit 8 receives the node information and the type information distributed from the control node 2. The transmitting unit 9 selects the data of the type specified by the received type information from the received data when the data were received from other distribution nodes 7. The transmitting unit 9 transmits the data of a selected type to the distribution node specified by the received node information. An example of a receiving unit is a definition setting unit 47. An example of the transmitting unit 9 is a transmission processing unit 46.

By being so configured, the distribution node can reduce the data amount forwarded between distribution nodes by forwarding, of the data received from other distribution nodes, only the data requested by the user to the distribution node of the distribution destination. In addition, since only the data type requested by the user are distributed to the user, the user can save the trouble of extracting necessary data from the distributed data.

In addition, the control node 7 further includes a request receiving unit 5. The request receiving unit 5 receives the distribution request requesting the data distribution of any type from an information processing terminal 12. An example of the request receiving unit 5 is a subscription controlling unit 31. The determining unit 3, when it receives the distribution request, determines a terminal distribution node (distribution node 7 which distributes data to information processing terminal 12) of the distribution nodes distributable to the information processing terminal 12 in accordance with the load information.

By being so configured, the distribution node 7 which actually distributes data to the information processing terminal 12 can be determined, in accordance with the load information, from among the distribution nodes distributable to the information processing terminal 12.

In addition, when the distributing node 7 is classified to a group, the determining unit 3 extracts, from node group information associating the distribution node 7 and the group, the distribution node which belongs to the group to which said distribution nodes (7, 23) belong, the distribution nodes having been set beforehand as distribution nodes distributing to the information processing terminal. The determining unit 3 determines which terminal distribution node is the distribution node 7 distributing data to the information processing terminal 12, in accordance with the load information, of the extracted distribution nodes.

By being so configured, the terminal distribution node can be determined from the distribution nodes which distribute data to the distribution node and which were set beforehand from among the plurality of distribution nodes as distribution nodes distributing data to said information processing terminal.

In addition, the determining unit 3 selects the distribution node which transmits or receives data of types which are targets of distribution requests of the distribution nodes extracted from the group as a terminal distribution node.

By being so configured, the distribution node which transmits or receives the data of types which are targets of distribution requests of the distribution nodes which belong to a certain group can be preferentially selected as a terminal distribution node, and therefore, unnecessary filtering processes can be saved.

Further, the determining unit 3 measures the copy counts of data received by the distribution node as the load information. The determining unit 3, in accordance with the copy counts, determines the terminal distribution node from among the distribution nodes distributable to the information processing terminal 12.

By being so configured, the distribution node can be determined to be a terminal distribution node, in accordance with copy counts, of the distribution nodes distributable to the information processing terminal 12.

The distribution node 7 further includes a load information reporting unit 10. The load information reporting unit 10 detects a utilization rate of a piece of operational equipment provided in the distribution node 7 and transmits the detected utilization rate of the operational equipment to the control node 2. An example of the load information reporting unit 10 is a load state collecting unit 54. At this time, the control node further includes a load information updating unit 11. The load information updating unit 11 uses the utilization rate of the operational equipment received from the distribution node 7 and updates the load information. An example of the load information updating unit 11 is a load information updating unit 53.

By being so configured, the distribution node can be determined to be a terminal distribution node, using the utilization rate of the operational equipment, of the distribution nodes distributable to the information processing terminal 12.

The determining unit 3 acquires the distribution node of the distribution destination determined by the distribution request after distribution of the node information of the distribution destination and the type information specifying the data type and the data type distributed to the distribution node of the distribution destination. At this time, the distribution unit 4 distributes the node information specifying the acquired distribution node of the distribution destination and the type information specifying the type of acquired data to the distribution node.

By being so configured, just the node information specifying the distribution node of the distribution destination updated on or after the time of distributing node information and type information and the type information (distribution definition) specifying the acquired type of data can be delivered.

The determining unit 3 determines the terminal distribution node as an uppermost distribution node in the distribution tree (which is a distribution route for transmitting data and is represented by a tree structure), said terminal distribution node being for an information processing terminal which transmitted the distribution request and having many data types included in the received distribution requests.

By being so configured, the uppermost distribution node in the distribution tree can be determined to be a terminal distribution node without changing the distribution tree. In this way, the data amount flowing on the network can be further reduced.

The determining unit 3 measures the number of distribution requests, including the which of the data types of the received distribution requests for each terminal distribution node is in the greatest number. The determining unit 3 determines which terminal distribution node has the highest number of distribution requests that are measured as a root of a distribution tree (which is a distribution route for distributing data and is represented by a tree structure).

By being so configured, since the logic topology between distribution nodes is reviewed and the distribution node distributing many data types for distribution requests can be made into a route of a distribution tree for many users, traffic flowing on the network can be reduced.

The control node further includes a communicating unit 6. The communicating unit 6 communicates between the control nodes when there are a plurality of control nodes 2 having a plurality of distribution nodes under management of the control nodes, respectively. When any of the control nodes 2 receives a distribution request, the determining unit 3 of the control node which received the distribution request performs the following process: the determining unit 3 selects the distribution node of the distribution destination to which one of a plurality of distribution nodes 7 subsequently performs distribution on the basis of the connection information between a plurality of distribution nodes 7 and the load information in each of the plurality of distribution nodes 7. At this time, the determining unit 3 determines, on the basis of the information specifying the distribution node under management of each control node, whether the selected distribution node is the distribution node under management of any of the control nodes. When it is determined that the selected distribution node is not the distribution node under management of any of the control nodes, the communicating unit performs the following process: the communicating unit reports to other control nodes that the communicating unit is sending data of the type which is the target of the distribution request from one or more of the distribution nodes under management of the other control nodes to the terminal distribution node for the information processing device which made a distribution request. An example of the communicating unit 6 is a control node linking unit 55.

By being so configured, the control nodes can be made operable in parallel, which enables data distribution even with the increased system scale.

In the present embodiment, in order to realize a reduction in the processing treatment for extracting the necessary data for each user as well as realize a reduction in unnecessary information forwarding, the following process is performed using the distribution node and the control node. Hereinafter, explanation is given treating the distribution node and the control node as separate instruments. However, these instruments may be physically integrated into the same instrument (node).

In the present embodiment, the distribution node sends only the data types having a distribution request from the user of the messages sent from the sensor to the user terminal. Messages include, for example, layer 3 (L3) header, layer 4 (L4) header, layer 7 (L7) protocol header, and message content.

An example of the layer 3 header is an IP (Internet Protocol) header. An example of the layer 4 header is a TCP (Transmission Control Protocol) header. An example of the layer 7 protocol header is an HTTP (HyperText Transfer Protocol) header.

For example, in the case of the messages constituted of XML (Extensible Markup Language), the distribution node causes only the tag that specifies the content corresponding to each data type having a distribution request from the user to be the distribution target.

Further, in the present embodiment, the distribution route from the distribution node to the user is changed on the basis of the state of the distribution system. With this, instead of concentrating the sensor information on one distribution node and distributing the sensor information from the concentrated distribution node, the sensor information can be distributed in a dispersed manner. The control node sets the distribution definition to each distribution node upon receiving the subscription request from the user. Here, on the basis of topology information, content of the subscription request, and a load state of each distribution node, the control node generates a distribution definition that would allow the user to copy data from the distribution node with a light load so that the load might not be concentrated at one point. The topology information means the information related to the positional relationship of the sensor, the distribution node, and the user. The control node performs the setting of the generated distribution definition for each distribution node.

Many variations can be considered regarding how to prepare this distribution definition. For example, a method is considered by which the connection between distribution nodes (a distribution tree) is set to be fixed, and only the distribution node which sends the data to the user via copying is switched. In this case, in the control node, the determination is made on the content of the copying process of distribution nodes and on the distribution node which becomes the connection destination of the user.

The control node 2 here is not limited to a client terminal such as a personal computer (PC), but any embodiment is applicable so long as the control node 2 is an application software which requires sensor information. For example, the control node 2 may be application software in a data center.

According to the present embodiment, the data amount forwarded between the distribution nodes can be reduced. By applying the present embodiment, in a distribution system with many clients and users which collects and distributes real time information, it becomes possible to provide each user with only the necessary information, preventing a concentration of load in the system. As a result, enhancement of response performance from a user's point of view and the reduction in the traffic amount flowing on the network can be realized at the same time.

<First Embodiment>

FIG. 2 illustrates the configuration example of the distribution system in the first embodiment. The distribution system 20 includes a server 21, a control node 22, a distribution node 23 (23-1 to 23-4), a sensor 24, and a user terminal 25 (25-1 and 25-2). The server 21, the control node 22, the distribution node 23 (23-1 to 23-4), the sensor 24, and the user terminal 25 (25-1 and 25-2) are connected via a network such as the internet or the like.

In the present embodiment, the sensor 24 collects four types of data (temperature (D1), moisture (D2), rainfall (D3), and wind velocity (D4)) and transmits the data regularly to the neighboring distribution node 23 (in FIG. 2, node 23-1) as an XML message. An example of the XML message transmitted by the sensor 24 is illustrated in FIG. 3. It is determined beforehand that the user needs a portion of the information of the information transmitted by the sensor 24.

The present embodiment is based on the premise that the user U1 requires that the data of data types D1 and D2 be included in the topic, and the user U2 requires only the data of the data type D1, and that the server 21 requires all the data (D1 to D4). In the present embodiment, the terminal 25-1 of the user U1, the terminal 25-2 of the user U2, and the server 21 are all treated as distribution destinations.

Hereinafter, in the explanation, identifiers of distribution nodes 23-1 to 23-4 are represented as Node 1 to Node 4.

FIG. 3 illustrates one example of the XML message in the first embodiment. In the XML message 29 in FIG. 3, headers of protocols such as HTTP headers and the like are abbreviated.

The XML message 29 includes the XML version information 29-1, the topic 29-2, the date and hour 29-3, and the data-type related information 29-41 to 29-44. The data-type related information 29-41 is information related to the data type D1, and as an example, includes the data type D1 and the value 25.5. The data-type related information 29-42 is information related to the data type D2, and as an example, includes the data type D2 and the value 49. The data-type related information 29-43 is information related to the data type D3, and as an example, includes the data type D3 and the value 0. The data-type related information 29-44 is information related to the data type D4, and as an example, includes the data type D4 and the value 5.

Examples of message content also include SOAP (Simple Object Access Protocol), REST (Representational State Transfer) command, HTML (HyperText Markup Language) text, and the like.

Figure 4:
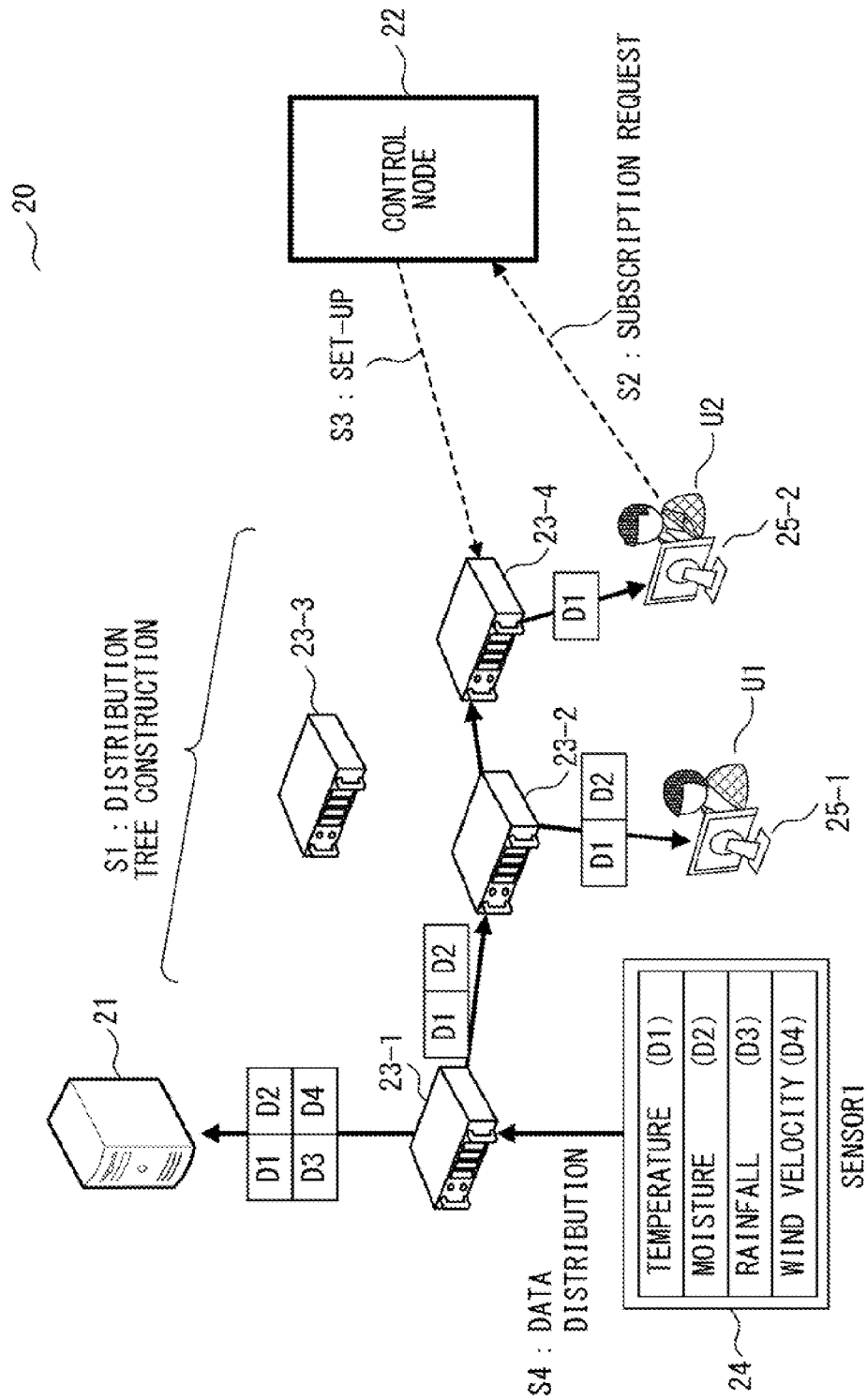
FIG. 4 illustrates an example of distribution flow in the first embodiment.

FIG. 4 illustrates an example of a distribution flow in the first embodiment. In the distribution system 20, four phases are included, a distribution tree constructing phase (S1), a subscription request receiving phase (S2), a setting phase (S3), and a data distributing phase (S4).

In the distribution tree constructing phase (S1), the distribution tree constructing information related to the association between distribution nodes is defined beforehand. The method of defining distribution tree constructing information is not particularly limited and, for example, an administrator may set the distribution tree constructing information manually, or construct a distribution tree using multicast routing protocols or the like.

In the subscription request receiving phase (S2), the control node 22 receives the data type required by the user of the data included in the topic designated by the user from the user terminal 25. In addition, the control node 22 changes the distribution node 23 which becomes the connection destination of the user terminal in accordance with the load of each of the current distribution nodes 23 so that a specific distribution node 23 will not be a bottleneck.

In the setting phase (S3), the control node 22 performs setting of a distribution definition to each distribution node 23 so that the data from the sensor 24 are distributed to the distribution destination with the determined distribution route.

In the data distributing phase (S4), on the basis of the distribution definition set in S3, by using the information related to the association between distribution nodes (link information), each of the distribution nodes 23 distributes only the data of the data type required by the user to the distribution destination set in the link information.

Figure 5:
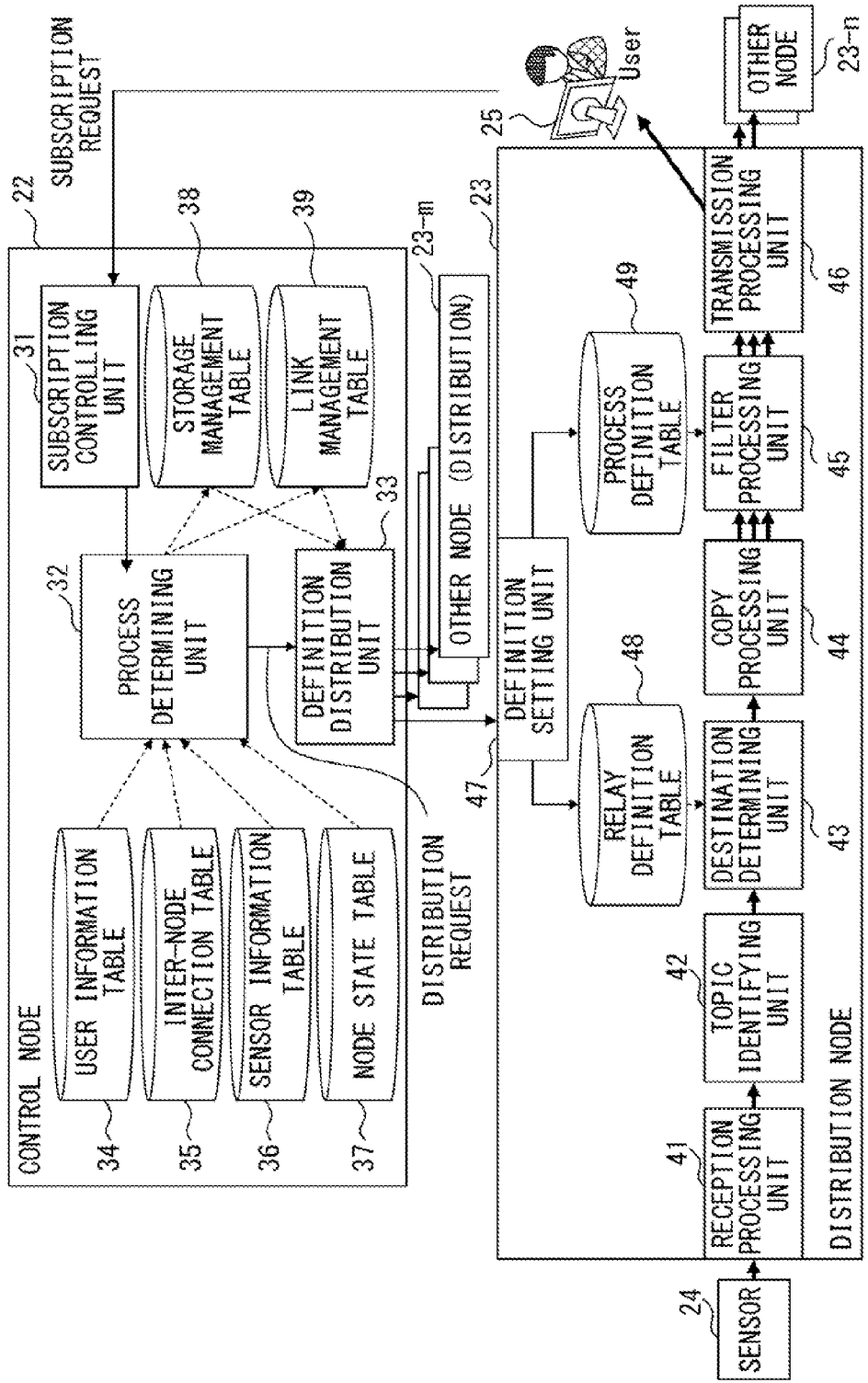
FIG. 5 illustrates a configuration block of a control node and a distribution node in the first embodiment.

FIG. 5 illustrates a configuration block of the control node and the distribution node in the first embodiment. The control node 22 is an information processing device on the network. The control node 22 includes a subscription controlling unit 31, a process determining unit 32, a definition distribution unit 33, a user information table 34, an inter-node connection table 35, a sensor information table 36, anode state table 37, a storage management table 38, and a link management table 39.

The subscription controlling unit 31 receives the subscription request from the user terminal 25 and writes the content of the subscription request in the user information table 34. The process determining unit 32 generates the content of a relay definition table 48 and the process definition table 49 using the information registered in a user information table 34, an inter-node connection table 35, a sensor information table 36, and a node state table 37.

The definition distribution unit 33 converts the content of a storage management table 38 and a link management table 39 into a format of a relay definition table 48 and a process definition table 49 of a distribution node, and distributes them to the distribution node 23-*m* at the distribution destination.

The user information table 34 is a table which manages the subscription request information of the user and the neighboring distribution node of the user. As to which distribution node the neighboring distribution node of the user is, it is defined to be set beforehand using the declaration from the user, the time taken from the transmission by the distribution node to the receipt by the user terminal (delay time), physical network information, etc. The neighboring distribution node of the user (neighboring node) does not define the node which distributes the data to the user but defines the distribution node which is located in the vicinity of the user geographically. The data distribution to the user terminal is actually distributed from the distribution node (a distribution node described in the storage node column of the storage management table 38) determined by the process determining unit 32. The purpose of setting the neighboring node is, as mentioned later, to set the starting point of the search, when searching for the distribution node with the lightest load from among the neighboring nodes which were set and the distribution nodes adjacent to said neighboring nodes.

The inter-node connection table 35 is a table which manages the connection relation between the distribution nodes. The manner of connecting between the distribution nodes and the manner of constructing the distribution route is defined to be determined by such techniques as manual settings by the administrator, constructing multicast trees, or the like.

The sensor information table 36 is a table which manages the neighboring distribution node of a sensor 24. Which distribution node is selected from among the neighboring distribution nodes 23 of the sensor 24 is defined to be set beforehand using the declaration from the owner of the sensor 24, the time taken from the transmission by the sensor 24 to the receipt by the distribution node (delay time), information of the physical network, etc.

The node state table 37 is a table which manages the load for the relaying process of each distribution node. The control node 22 manages the load of each distribution node 23 by managing the maximum throughput and the current process state by using the node state table 37. The node state table 37 may collect the CPU utilization rate or the like of each distribution node 23 regularly, or, for example, when the distribution data are generated constantly, the node state table 37 may manage the load by defining the number of processes in the distribution node 23 as the load. In the present embodiment, as an example of the latter, the node state table 37 manages the copy counts for messages per distribution node as a load.

The storage management table 38 is a table which manages the distribution node storing the user terminal, that is, the distribution node actually distributing data to the user terminal 25. Even when the neighboring distribution node 23 can be specified by the user information table 34, in some cases, the distribution node 23 that actually and directly delivers data to the user terminal 23 and the neighboring distribution node may be different. Thus, the control node 22 prepares a table which is different from the user information table 34 as a storage management table 38 and manages the distribution node which actually distributes the data to the user terminal 25. In addition, the control node 22 manages the distribution of data to users by using the storage management table 38 as well.

The link management table 39 is a table which grasps the relaying route connecting between distribution nodes as a link and manages the data type distributed by each link.

The distribution node 23 is a relaying process device on a network. The distribution node 23 includes a reception processing unit 41, a topic identifying unit 42, an destination determining unit 43, a copy processing unit 44, a filter processing unit 45, a transmission processing unit 46, a definition setting unit 47, a relay definition table 48, and a process definition table 49.

The reception processing unit 41 receives a packet from a sensor 24 or a neighboring distribution node 23, and constitutes a message by assembling the received packet. The topic identifying unit 42 identifies a topic included in the constituted message.

The destination determining unit 43, following the relay definition table 48, determines one or more of the relay destinations of the distribution data as a destination. The copy processing unit 44 copies messages to be distributed to the relay destination in accordance with the number of destinations determined by the destination determining unit 43.

The filter processing unit 45, following the content of the determined destination and the content of the process definition table 49, deletes the XML tag on the unnecessary data type from the distributed message for each destination (filtering process). The transmission processing unit 46 decomposes a filter-processed message into a packet and transmits the decomposed packet to the designated destination (for example, another distribution node 23-n, user terminal 25, server 21, etc.).

The definition setting unit 47, on the basis of the distribution definition distributed from the control node 22, sets the relay definition table 48 and the process definition table 49. The relay definition table 48 is a table which manages the relay destination node and/or a user group to be distributed for each topic. The process definition table 49 is a table which manages the data type to be delivered for each topic and/or destination.

Figure 6:
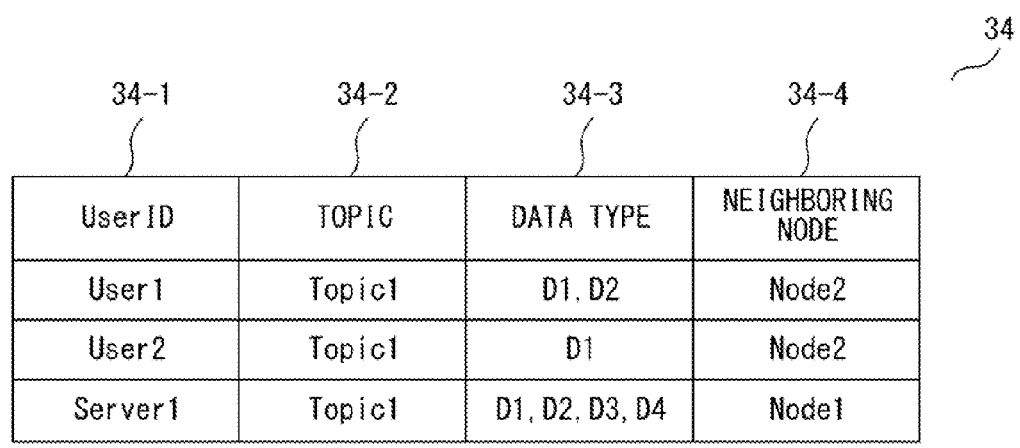
FIG. 6 illustrates a configuration example of a user information table in the first embodiment.

FIG. 6 illustrates a configuration example of a user information table in the first embodiment. The user information table 34 includes the data items "user-ID" 34-1, "topic" 34-2, "data type" 34-3, and "neighboring node" 34-4. In the "user-ID" 34-1, identification information which identifies the user is stored. In the "topic" 34-2, identification information which identifies the topic that is a subscription target by the user is stored. In the "data type" 34-3, the data type to which the user is subscribed is stored. In the "neighboring node" 34-4, the identification information which identifies the distribution node provided adjacent to the user terminal is stored.

Figure 7:
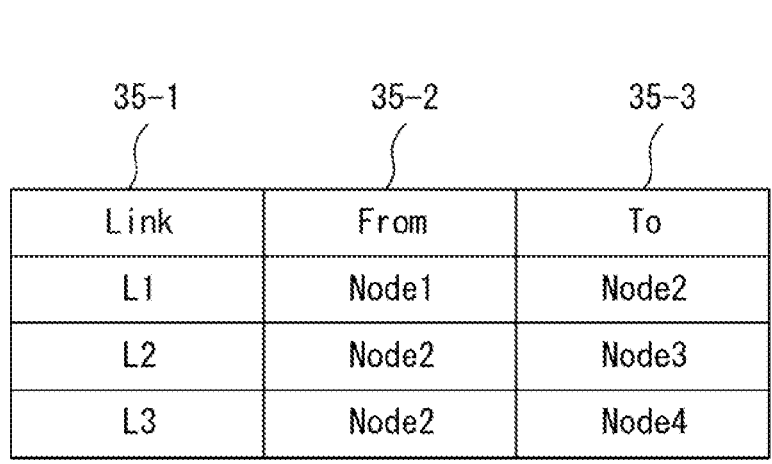
FIG. 7 illustrates a configuration example of an inter-node connection table in the first embodiment.

FIG. 7 illustrates a configuration example of an inter-node connection table in the first embodiment. The inter-node connection table 35 includes "link" 35-1, "From" 35-2, and "To" 35-3. In the "link" 35-1, identification information which identifies the link between the distribution nodes 23 is stored. In the "From" 35-2, the identification information or address of the distribution node 23 of the connection source of the link is stored. In the "To" 35-3, identification information or an address of the distribution node of the connection destination of the link is stored.

FIG. 8 illustrates a configuration example of a sensor information table in the first embodiment. The sensor information table 36 includes the data items of "sensor ID" 36-1, "topic" 36-2, and "storage node" 36-3. In the "sensor ID" 36-1, the identification information which identifies the sensor 24 is stored. In the "topic" 36-2, the identification information which identifies a topic regarding the corresponding sensor is stored. In the "storage node" 36-3, identification information of the distribution node which stores the sensor 24 corresponding to the sensor ID, that is, the identification information of the distribution node in the vicinity of the sensor, is stored.

FIG. 9 illustrates a configuration example of a node state table in the first embodiment. The node state table 37 includes the data items of "node" 37-1, "allowable processing amount" 37-2, and "load amount" 37-3. In the "node" 37-1, the identification information which identifies the distribution node 23 is stored. In the "allowable processing amount" 37-2, the value of maximum throughput of the distribution node 23 is stored. In the "load amount" 37-3, the current processing amount of the distribution node 23 is stored.

Figure 10:
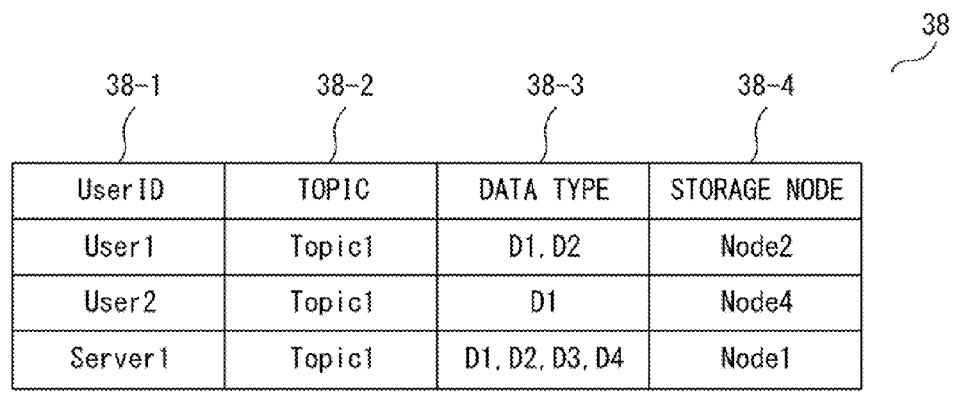
FIG. 10 illustrates a configuration example of a storage management table in the first embodiment.

FIG. 10 illustrates a configuration example of a storage management table in the first embodiment. The storage management table 38 includes the data items of "user ID" 38-1, "topic" 38-2, "data type" 38-3, and "storage node" 38-4. In the "user ID" 38-1, the identification information which identifies the user is stored. In the "topic" 38-2, the identification information which identifies the topic corresponding to the user is stored. In the "data type" 38-3, the data type to which the user is subscribed is stored. In the "storage node" 38-4, the identification information which identifies the distribution node storing the user terminal 25 is stored.

Figure 11:
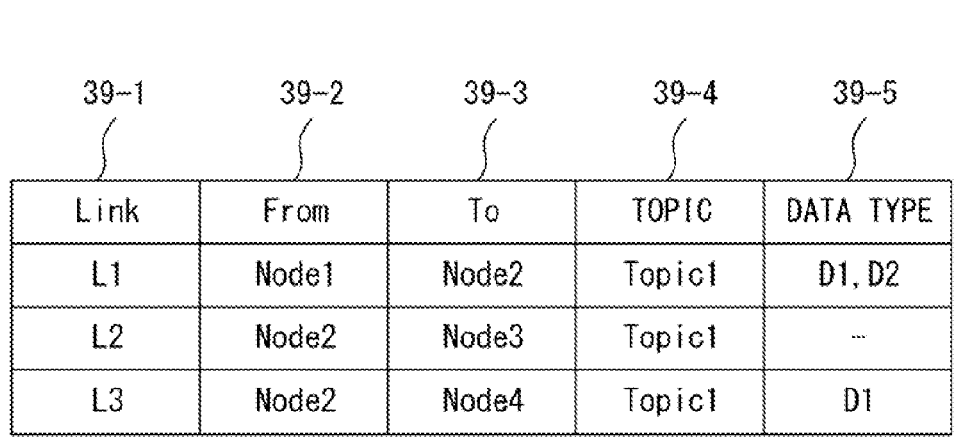
FIG. 11 illustrates a configuration example of a link management table in the first embodiment.

FIG. 11 illustrates a configuration example of a link management table in the first embodiment. The link management table 39 includes the data items of "link" 39-1, "From" 39-2, "To" 39-3, "topic" 39-4, and "data type" 39-5. In the "link" 39-1, identification information which identifies the link between the distribution nodes is stored. In the "From" 39-2, the identification information or address of the distribution node of the connection source of the link is stored. In the "To" 39-3, identification information or an address of the distribution node of the connection destination of the link is stored. In the "topic" 39-4, the identification information which identifies the topic transmitted to the distribution node of the connection destination of the link is stored. In the "data type" 39-5, the data type transmitted to the distribution node of the connection destination of the link is stored.

FIG. 12 illustrates a configuration example of a relay definition table in the first embodiment. The relay definition table 48 includes the data item of "topic" 48-1 and "destination" 48-2. In the "topic" 48-1, identification information which identifies the topic is stored. In the "destination" 48-2, the identification information or address which identifies the distribution destination of the data from the distribution node for each topic is stored. For example, the entry destination="Node 2" corresponds to the relay to the node of the relay destination, and the entry destination="Server 1" corresponds to the distribution to the user. For example, when the user ID of the user 2 is "User 2", the "User 2" is set in the destination column in distributing data to the user U2.

FIG. 13 illustrates a configuration example of a process definition table in the first embodiment. In the "topic" 49-1 of the process definition table 49, the identification information which identifies the topic is stored. In the "relay destination" 49-2, the identification information or address which identifies a distribution destination to which the topic is distributed is stored. In the "data type" 49-3, the data type distributed to the corresponding distribution destination is stored.

FIG. 14 illustrates a total flow example of a control node in the first embodiment. In the present embodiment, the user U1 is defined as having completed a subscription of distribution data D1 and D2 of topic 1. In addition, the user terminal 25-1 utilized by the user U1 is defined as receiving information from the sensor 24 from the distribution node 23-1 (Node 1) via the distribution node 23-2 (Node 2). Further, the server 21 is defined as having completed a subscription of all the data (D1 to D4) of topic 1 and receiving information from the sensor 24 from the distribution node 23-1. At this time, the user U2 is defined as newly making a subscription request for the data D1 of topic 1.

The user U2 reports a subscription request to the control node 22 using the user terminal 25-2. At this time, from the user terminal 25-2, together with the subscription request, the user ID of the user U2 (User 2), the data type to which the user U2 makes a subscription request (D1), and information of the neighboring node of the user terminal 25-2 (distribution node 23-4 (Node 4)) are transmitted to the control node 22 as user subscription information. The control node 22 may also manage the information of the neighboring node and obtain information of the neighboring node on the basis of the user ID (User 2) reported from the user terminal 25-2.

The subscription controlling unit 31, when it receives subscription controlling information (a subscription request) from the user terminal 25-2 ("Yes" in S11 and S12), adds the user subscription information received from the user terminal 25-2 to the user information table 34 (S13). The subscription controlling unit 31 reports to the process determining unit 32 that the number of the user has increased.

Next, the process determining unit 32 performs a process of determining distribution nodes (S14). In the process of determining distribution nodes (S14), the distribution node which actually distributes the distribution data to the user terminal 25-2 is determined. The process of S14 is explained using FIG. 15.

The process determining unit 32 performs a process of adding data types (S15). In the process of adding data types (S15), the data type is added to the link management table 39 so that the data type D1 required by the user U2 is distributed to the distribution node determined in S14. Subsequently, the process determining unit 32 requests that the definition distribution unit 33 distribute the distribution definition information on the data types.

The definition distribution unit 33, upon receiving the distribution request from the process determining unit 32, distributes the distribution definition information to each distribution node 23 (S16).

Next, explanation is given for cancelling a subscription. The topic whose subscription is to be cancelled is reported to the control node 22 from the user terminal 25, and from the user information table 34, the user subscription information which is the target of a subscription cancellation is deleted. The process hereinafter is the same as that of the subscription request. Hereinafter, a detailed explanation is given for the subscription cancellation.

The user U2 reports a subscription cancelling request to the control node 22 using the user terminal 25-2. At this time, the user terminal 25, with the subscription cancelling request, transmits the user ID of the user U2 (User 2), the data type whose subscription is cancelled (D1), and information of the neighboring node of the user terminal 25 (distribution node 23-4 (Node 4)) to the control node 22 as user subscription cancelling information.

The subscription controlling unit 31, when it receives the subscription controlling information (subscription cancelling request) from the user terminal 25-2 ("No" in S11 and S12), deletes the entry which corresponds to the subscription cancelling information from the user information table 34 (S17). The subscription controlling unit 31 reports to the process determining unit 32 that the number of the user has decreased.

The process determining unit 32, using the subscription cancelling information from the subscription controlling unit 31, acquires the identification information of the distribution node distributing the distribution data to the user terminal 25-2 which reported the subscription cancelling request from the "storage node" of the storage management table (S18).

In the node state table 37, the process determining unit 32 decreases the "load amount" of the distribution node acquired in S18 by the predetermined value (S19). The value to be decreased differs in accordance with the types of loads to be monitored, e.g., whether the "load amount" to be used is any of a CPU utilization rate, memory utilization rate, etc.

The process determining unit 32 performs the process of deleting data types (S20). In the process of deleting data types (S20), the data types are deleted from the link management table 39 so that the data types whose subscription is cancelled by the user U2 are not unnecessarily distributed to the distribution node which distributes the distribution data to the user terminal 25-2 with the subscription cancelled.

The definition distribution unit 33 distributes the distribution definition information to each distribution node 23 upon receiving a distribution request from the process determining unit 32 (S16).

Figure 15:
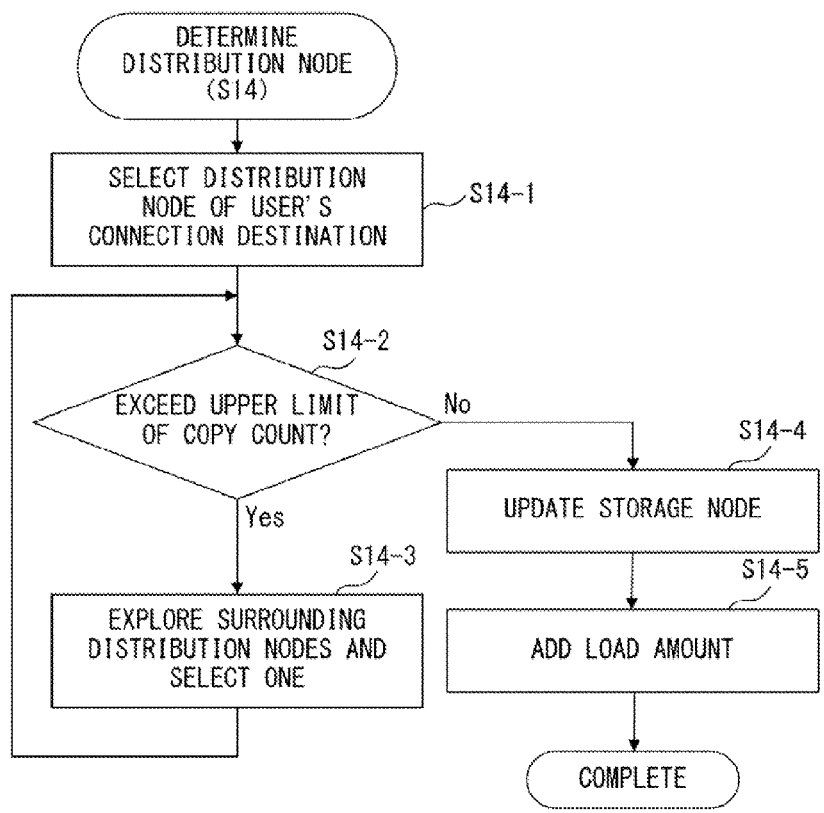
FIG. 15 illustrates a flow of a process of determining a distribution node (S14) of a control node in the first embodiment.

FIG. 15 illustrates a flow of a process of determining a distribution node (S14) of a control node in the first embodiment. The process determining unit 32 reads the corresponding entry (User 2, Topic 1, D1, and Node 4) of the user information table 34 upon receiving the report from the subscription controlling unit 31 and selects the distribution node of the connection destination of the user terminal 25-2 (S14-1).

Next, the process determining unit 32 refers to the node state table 37 and determines whether or not the load amount (for example, the number of copies) of the node (Node 4) included in the user subscription information exceeds the predetermined threshold value (S14-2). Here, the predetermined threshold value is a value set to the "allowable processing amount" of the node state table 37.

In S14-2, when the load amount of the node (Node 4) included in the user subscription information does not exceed the threshold value ("No" in S14-2), the node (Node 4) is selected.

On the other hand, when the load of the node (Node 4) included in the user subscription information exceeds the threshold value ("Yes" in S14-2), the process determining unit 32 performs the following process. That is, the process determining unit 32, using the inter-node connection table 35, sequentially searches for the node whose load does not exceed the threshold value of the nodes adjacent to the neighboring node (Node 4) included in the user subscription information and selects the node (S14-3).

The process determining unit 32 adds the Node Number (Node 4) of the Node selected in S14-1 or S14-3, the user ID (User 2), and the data type (D1) to the storage management table 38 (S14-4).

The process determining unit 32, in the node state table 35, increases the load amount of the entry which corresponds to the Node number (Node 4) selected in S14-1 or S14-3 by the predetermined amount (S19). When the "load amount" is the copy count, "1" is added to the load amount of the entry which corresponds to the Node number (Node 4).

Figure 16:
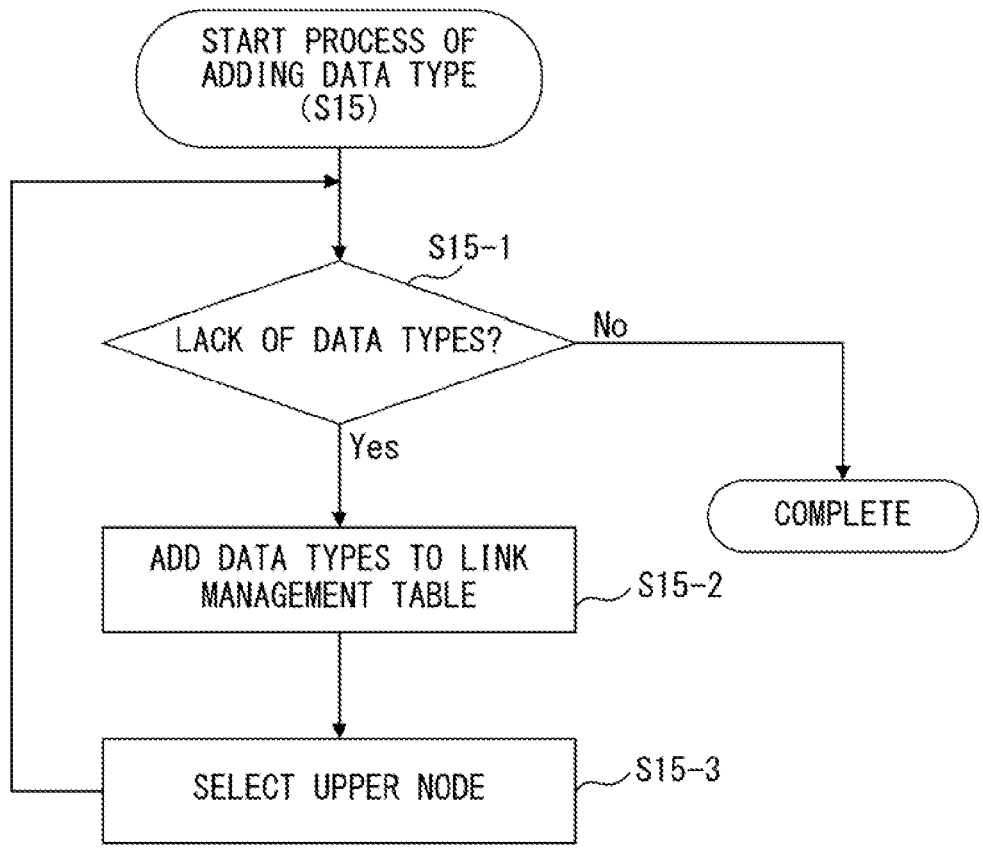
FIG. 16 illustrates a flow of a process of adding data (S15) of a control node in the first embodiment.

FIG. 16 illustrates a flow of a process of adding data (S15) of a control node in the first embodiment. The process determining unit 32 reads the inter-node connection table 35 and specifies the link between the node (Node 4) determined in S14 and the distribution node (Node 2) making the determined node a connection destination. Then, the process determining unit 32 confirms in regard to the link whether or not the distribution data (D1) of the data type included in the user subscription information is set to be delivered by using the link management table 39.

To be specific, the process determining unit 32, in the inter-node connection table 35, searches for the entry in which the node set in the "To" column is the node determined in S14 (Node 4). The process determining unit 32 acquires the identification information of the link (L3) stored in the data item "link" of the searched for entry and the identification information of the node (Node 2) stored in the "From". The process determining unit 32 acquires the entry including the identification information (L3) of the acquired link from the link management table 39. The process determining unit 32 confirms whether or not the data type (D1) included in the user subscription information is stored in the "data type" of the acquired entry (S15-1). When the data type (D1) included in the user subscription information is stored in the "data type" of the acquired entry, that is, when the data type is not insufficient ("No" in S15-1), the flow is completed since D1 is delivered to Node 4.

When the data type (D1) included in the user subscription information is not stored in the "data type" of the entry acquired from the link management table 39, that is, when the data type is insufficient ("Yes" in S15-1), since D1 is not delivered to the storage node (Node 4), the process determining unit 32 performs the following process. That is, the process determining unit 32 stores the data type (D1) included in the user subscription information in the data item "data type" of the acquired entry (S15-2). Subsequently, the process determining unit 32 searches for the upper node (the connection source of the link) of the storage node (Node 4) in the inter-node connection table 35 so that D1 can be distributed sequentially from the node which is closer to the sensor 24 (S15-3), and repeats S15-1 and S15-2. In the present embodiment, since the data of the data type (D1) have been delivered to Node 2, "D1" is set in the data item "data type" of the entry illustrating the link from Node 2 to Node 4 in the link management table 39.

The process determining unit 32 requests that the definition distribution unit 33 distribute the distribution definition to the distribution node at the time at which the updating of the link management table 39 has been completed.

The above mentioned method is the method to distribute data of the data type required by the user to the user terminal 25 of the user with the increase in the number of users with subscription requests. However, for the purposes of optimizing the total distribution system, the total storage management and link management may be reviewed regularly. A detailed explanation of this is given in the fifth and sixth embodiments.

Figure 17:
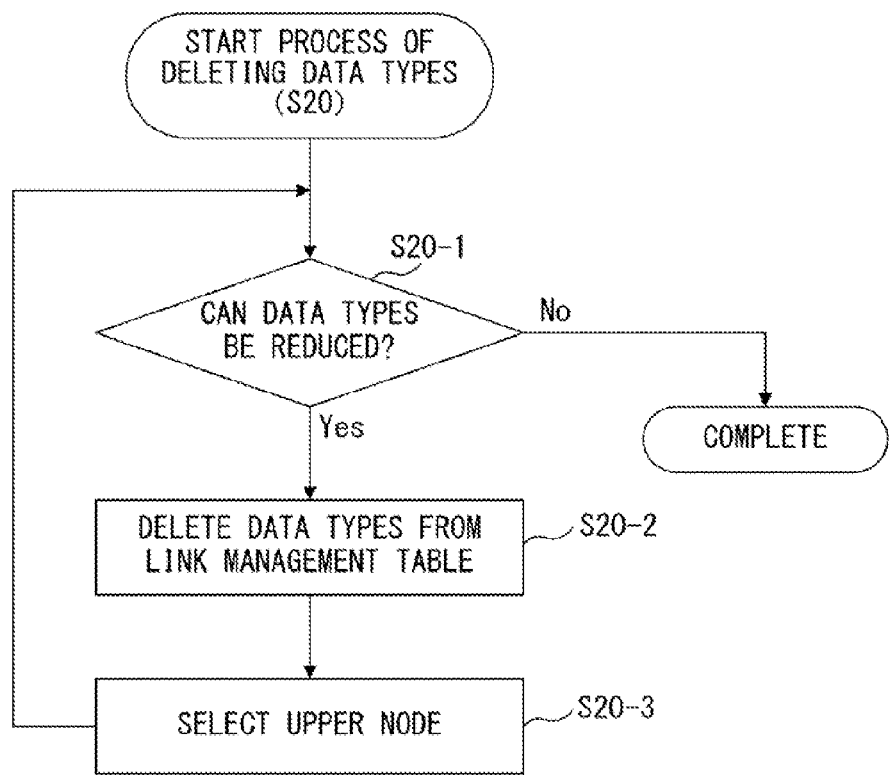
FIG. 17 illustrates a flow of a process of deleting data of a control node in the first embodiment.

FIG. 17 illustrates a flow of a process of deleting data of a control node in the first embodiment. The process determining unit 32 searches for an entry having a user ID which conforms to the user ID included in the subscription cancelling information from the storage management table 38 and acquires the identification information of the node stored in the data item "storage node" of the entry. The process determining unit 32 searches for the entry "To"=the acquired node "Node 4" in the inter-node connection table 35. The process determining unit 32 acquires the identification information of the link (L3) stored in the "link" of the searched for entry and the identification information of the node (Node 2) stored in the "From". The process determining unit 32 deletes D1 when "D1" is included in the data type of the entry which includes identification information of the acquired link (L3) from the link management table 39 ("Yes" in S20-1, S20-2).

The process determining unit 32 searches for the upper node (connection source of the link) (S20-3), and deletes the data type (D1) from the entry of the link management table 39 of the upper node. The process determining unit 32 requests that the definition distribution unit 33 distribute the distribution definition to the distribution node 23 at the time at which the updating of the link management table 39 has been completed.

Figure 18:
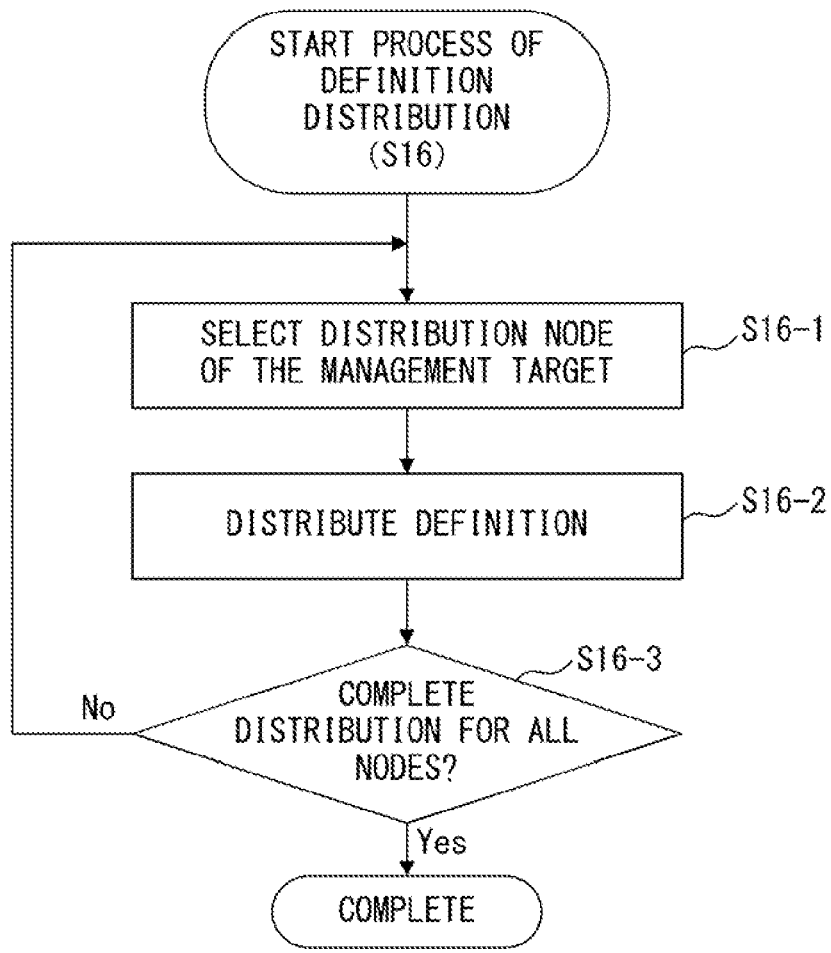
FIG. 18 illustrates a flow of a process of setting data performed by a control node in the first embodiment.

FIG. 18 illustrates a flow of a process of setting data performed by a control node in the first embodiment. The definition distribution unit 33, upon receiving the distribution request of the distribution definition from the process determining unit 32, selects the connection destination node of the storage management table 38 and the node of the From column of the link management table 39 (S16-1). The definition distribution unit 33 transmits the entry of the storage management table 38 and the link management table as distribution definitions for the selected node (S16-2). The definition distribution unit 33 repeats the processes of S16-1 to S16-2 for all of the nodes.

Figure 19:
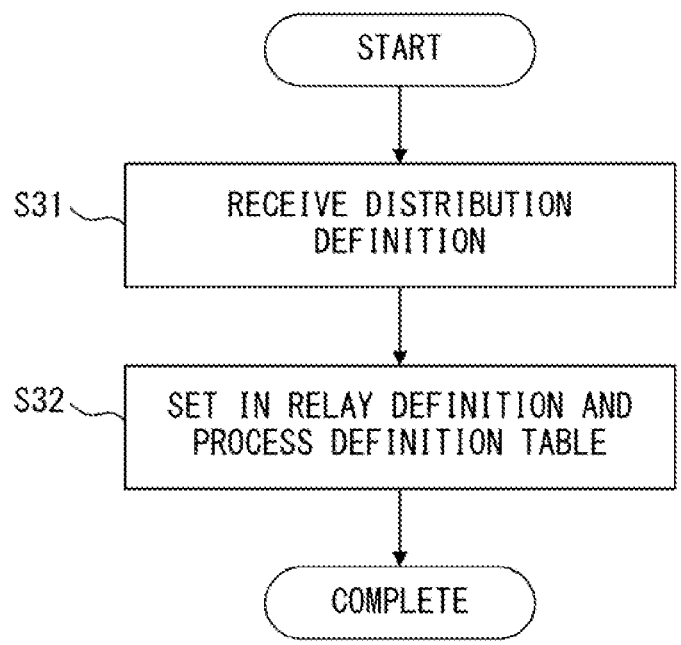
FIG. 19 illustrates a flow of a distribution node at the time of receiving a distribution definition from a control node in the first embodiment.

FIG. 19 illustrates a flow of a distribution node at the time of receiving a distribution definition from the control node in the first embodiment. The definition setting unit 47 of the distribution node 23 receives the distribution definition (entry of the storage management table 38 and the link management table 39) distributed from the control node 22 (S31). The definition setting unit 47 analyzes the received distribution definition and sets the analyzed distribution definition to the relay definition table 48 and the process definition table 49 (S32).

That is, in S32, the definition setting unit 47 analyzes the distribution definition distributed from the control node 22, and registers the storage node and the user ID of the storage management table 38 as a destination of relay definition table 48. For example, in the case of distribution node 23-1, Node 2 and Server 1 are registered in a relay definition table 48 as the destination. The address information of Node 2 and Server 1 are defined to be set in the control node 22 or distribution node 23 and in a state in which the address can be solved.

In addition, in S32, the definition setting unit 47 registers the data type defined for each "User ID" of the storage management table 38 and for each "To" of the link management table 39 in the process defining table 49. The entry is registered in the process definition table 49 in such a way as to forward D1, D2, D3, and D4 to Server 1 and to forward D1 and D2 to Node 2, for example in the distribution node 23-1.

Figure 20:
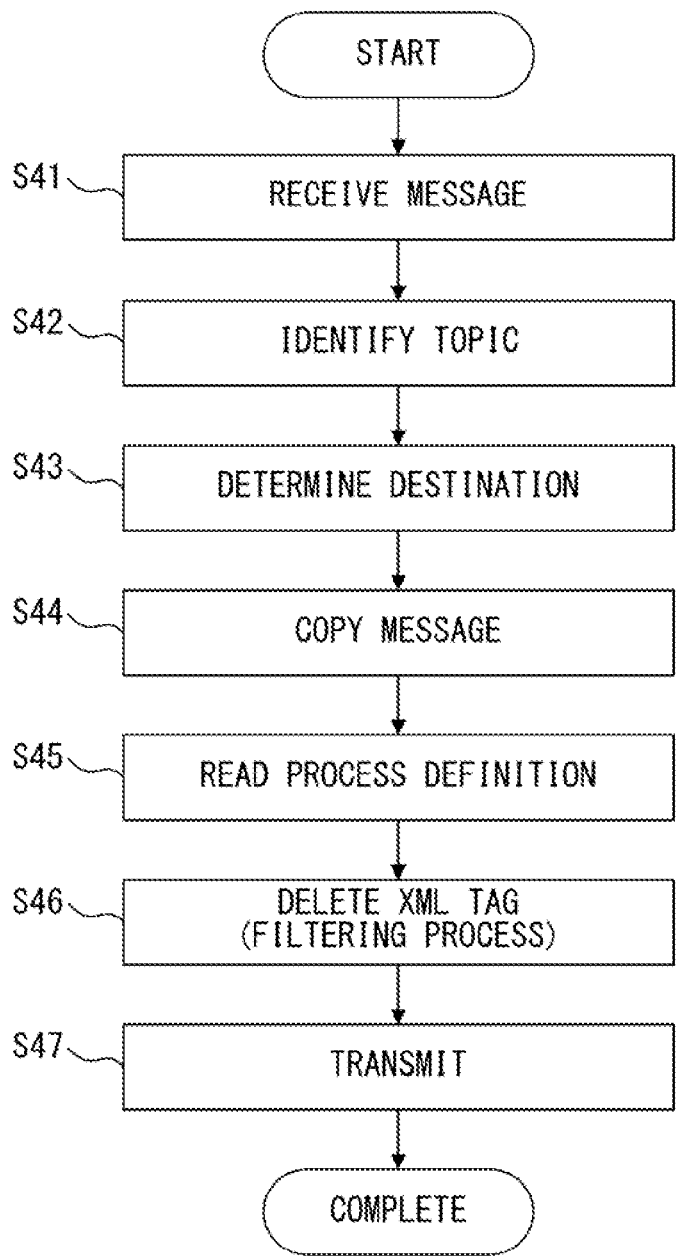
FIG. 20 illustrates a flow of a distribution node at the time of a message in the first embodiment.

FIG. 20 illustrates a flow of a distribution node at the time of receiving a message in the first embodiment. Hereinafter, taking the distribution node 23-1 as an example, the flow of FIG. 20 is explained. The sensor 24 transmits the message which includes D1 to D4 to the distribution node 23-1.

The reception processing unit 41 receives the message (S41). The topic identifying unit 42 analyzes the received message and acquires the identification information of the topic (S42). In the case of the distribution node 23-1, the topic identifying unit 42 identifies that it is a message on topic 1.

The destination determining unit 43 searches the relay definition table 48 with a topic identified in S42 as a key, reads the destination information of the entry which includes the key, and determines the destination (S43). In the case of the distribution node 23-1, the destination determining unit 43 reads that the destination is Server 1 and Node 2 with topic 1 identified in S42 as a key. The destination determining unit 43 reports the read destination to a copy processing unit 44.

The copy processing unit 44, in accordance with the number of reported destinations, copies the received message (S44). In the case of the distribution node 23-1, the copy processing unit 44 copies the received message to prepare a message for the attention of Server 1 and Node 2, since there are two destinations reported from the destination determining unit 43.

The filter processing unit 45, on the basis of the process definition table 49, deletes unnecessary XML tags from the received message (filtering process) (S45, S46).

In the case of the distribution node 23-1, a filter processing unit 45 refers to the content of the process definition table 49 and forwards the message whose destination is Server 1 as it is. On the other hand, the filter processing unit 45, regarding the message whose destination is Node 2, deletes the XML tags of the data types D3 and D4 and prepares the message with only XML tags concerning the data types D1 and D2.

The transmission processing unit 46 forwards the message processed by the filter processing unit 45 to each destination (S47).

Hereinafter, a similar process is repeated in each distribution node 23 and necessary data are delivered to a server 21, a user terminal 25-1, and a user terminal 25-2, respectively.

For information, there is no dependency with respect to the order of the copying process and the filtering process, and when it is already known that the same filtering process has been repeatedly performed, for enhancing the process efficiency, the filtering process may be performed first, followed by the copying process.

Thus, of one or more distribution nodes adjacent to the user terminal 25, a distribution node having some room for a load can be determined to be the distribution node which actually distributes data to the user terminal 25. From the determined distribution node, on the basis of the existing link relation, tracing is available up to the upper distribution node to which the data of the data type required by the user terminal 25 are received. And from the upper distribution node, the data of the data type can be pulled into the determined distribution node.

According to the present embodiment, the control node generates the distribution definition of the relaying process on the basis of the topology information (positional relationship of a sensor, a distribution node and a user), the content of a subscription request, and the load state of each distribution node upon receipt of the user subscription request. And the control node instructs each distribution node to set the distribution definition. The distribution node, following the instruction from the control node, performs copying, filtering, and relaying processes. In this way, just the necessary data can be distributed dispersedly to a plurality of users.

<Second Embodiment>

In the present embodiment, explanation is given for the processing content when only the distribution definition updated on and after the previous distribution time is distributed to the distribution node. In the second embodiment, the same reference numerals are allotted to a similar configuration to that of the first embodiment and the explanation thereof is abbreviated.

Figure 21:
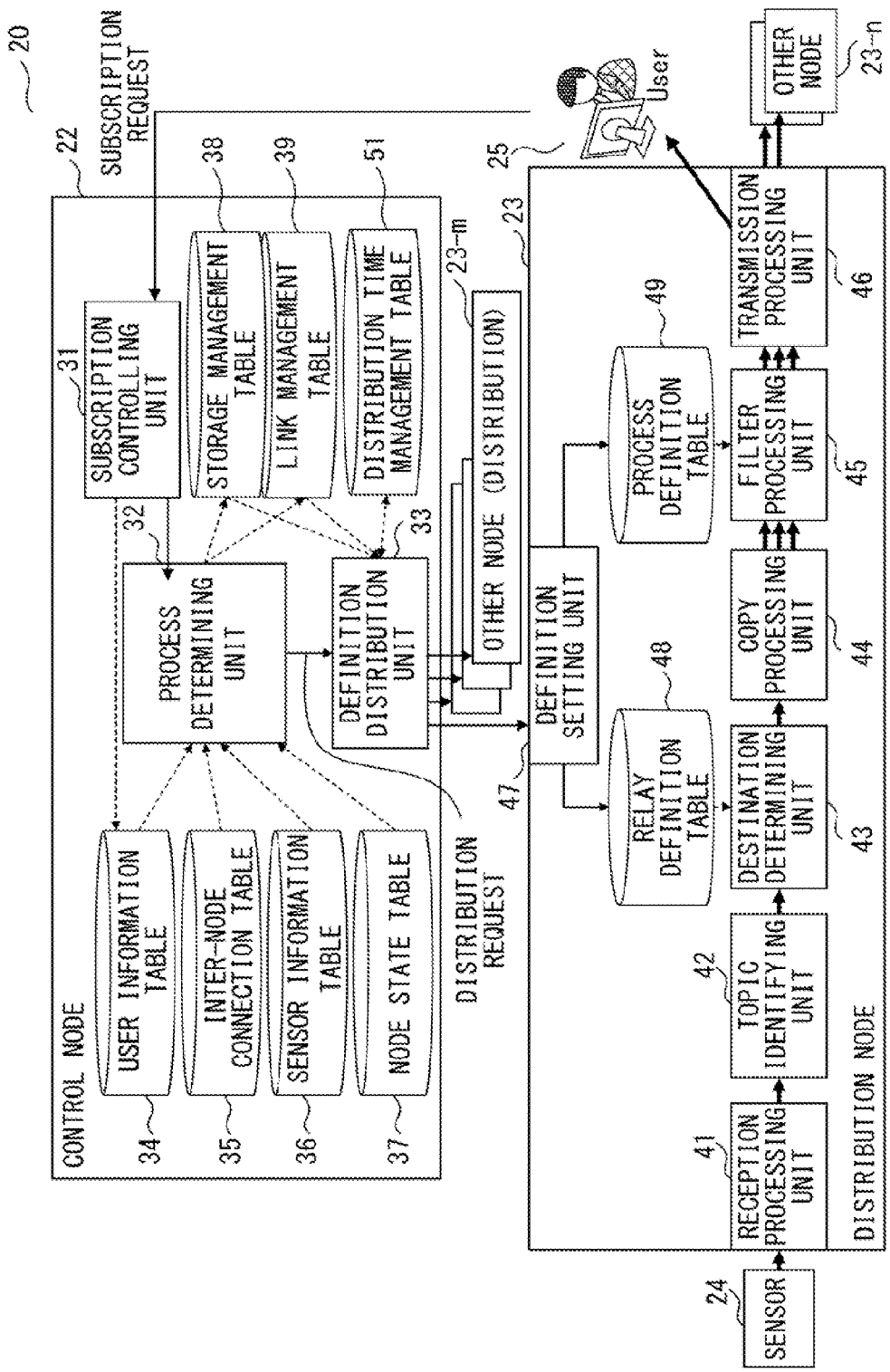
FIG. 21 illustrates a configuration block of a control node and a distribution node in the second embodiment.

FIG. 21 illustrates the control node in the second embodiment and the configuration block of the distribution node in the second embodiment. The distribution system 20 in the second embodiment has the distribution time management table 51 added in the control node 22 of the first embodiment. Further, in the storage management table 38*a*, a data item of "updated time" is added to the storage management table 38. In the link management table 39*a*, a data item of "updated time" is added to the link management table 39.

The distribution time management table 51 maintains the date and hour at which the previous distribution was made.

In addition to the function of the first embodiment, the process determining unit 32 confirms the entry of the current storage management table and the link management table, the content to be updated, added, or deleted, and changes the updated time of storage management table 38*a* and the link management table 39*a*. When the content is to be deleted, the process determining unit 32 performs the process of deletion not by deleting the entry of the link management table 39*a* but by leaving the data type column of the link management table 39*a* blank.

In addition to the function of the first embodiment, the definition distribution unit 33 reads the previous distribution time from the distribution time management table 51 and distributes only the entries (distribution definition) of storage management table 38*a* and the link management table 39*a* updated on and after the previous distribution time to the distribution node 23. In addition, the definition distribution unit 33 updates the distribution time of the distribution time management table 51 by the date and hour at which the distribution definition is distributed to the distribution node 23.

FIG. 22 illustrates the configuration example of the distribution time management table in the second embodiment. The distribution time management table 51 includes the data items "topic" 51-1 and "distribution time" 51-2. In the "topic" 51-1, the identification information of the topic is stored. In the "distribution time" 51-2, the time at which the previous distribution was made is stored.

FIG. 23 illustrates the configuration example of the storage management table in the second embodiment. The storage management table 38a has the data item "updated time" 38-5 added to the storage management table 38 of FIG. 10. In the "distribution time" 38-5, the date and hour at which said entry was added or updated is stored.

FIG. 24 illustrates the configuration example of the link management table in the second embodiment. The storage management table 39a has the data item "updated time" 39-6 added to the link management table 39 of FIG. 11. In the "distribution time" 39-6, the date and hour at which said entry was added or updated is stored.

Next, an explanation is given for the process flow of the control node in the second embodiment. The process flow of the control node in the second embodiment has the processes of FIGS. 16 to 18 partially changed compared with the process in the first embodiment (FIGS. 15 to 18). For this, explanation is given using FIGS. 25 and 26.

Figure 25:
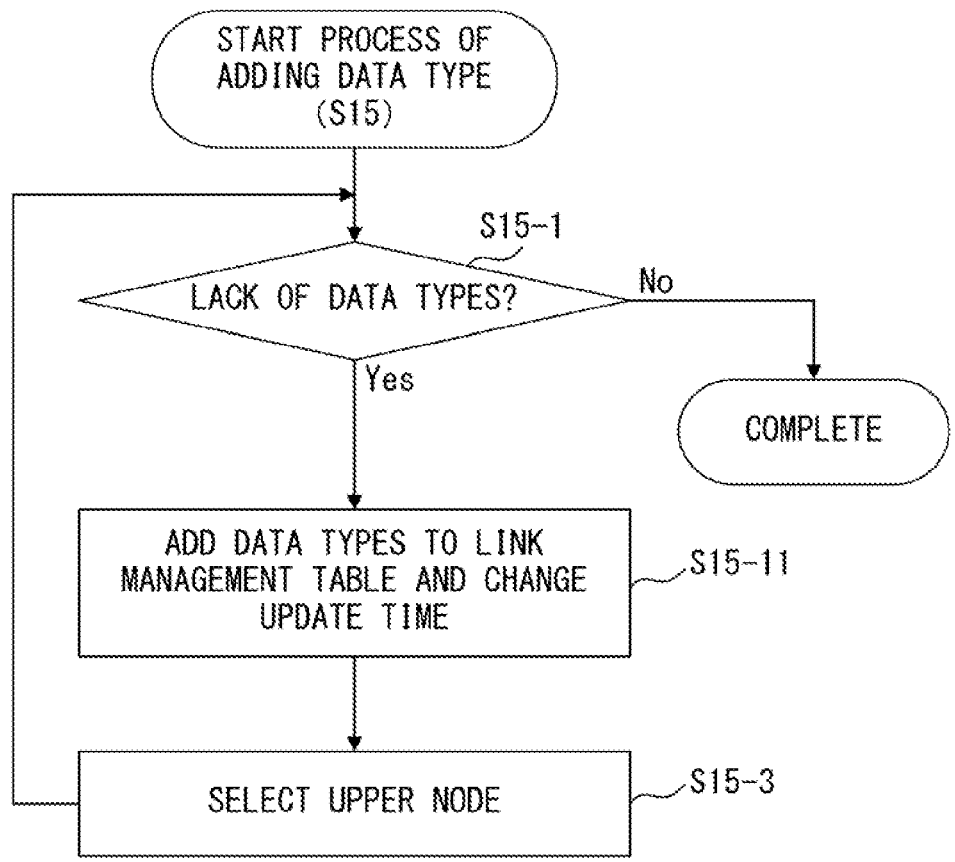
FIG. 25 illustrates a flow of a process of adding data of a control node in the second embodiment.

FIG. 25 illustrates the flow of the process of adding data of the control node in the second embodiment. FIG. 25 is the figure having S15-2 of FIG. 16 replaced with S15-11. In S15-11, the process determining unit 32 searches for the upper node (a connection source of the link) from the inter-node connection table 35 so that D1 can be distributed sequentially from the node closer to the sensor 24 and adds the entry and data type of the link management table 39. Further, the process determining unit 32 updates the updated time of the storage management table 38a and link management table 39a with the current time.

FIG. 26 illustrates the flow of the process of deleting the data of the control node in the second embodiment. FIG. 26 is the figure having S20-2 of FIG. 17 replaced with S20-11. The process determining unit 32 searches for the entry with the user ID conforming to the user ID included in the subscription cancelling information from the storage management table 38 and acquires the identification information of the node stored in the data item of "storage node". The process determining unit 32 searches for the entry "To"=the acquired node "Node 4" in the inter-node connection table 35. The process determining unit 32 acquires the identification information of the link stored in the "link" of the searched for entry and the identification information of the node stored in "From". In the link management table 39a, when the data type (D1) which is the target of a subscription cancelling request is included in the data type of the entry including the identification information of the acquired link (L3) ("Yes" in S20-1), the process determining unit 32 deletes the data type (D1) of the entry. Further, the process determining unit 32 updates the updated time of the storage management table 38a and the link management table 39a with the current time (S20-11).

FIG. 27 illustrates the flow of the data setting process performed by the control node in the second embodiment. FIG. 27 has S16-11 added to FIG. 18. In S16-11, the definition distribution unit 33 reads the previous distribution time from the distribution time management table 51. The definition distribution unit 33 compares the distribution time read from the distribution time management table 51 and the updated time of the storage management table 38a and the link management table 39a. The definition distribution unit 33 extracts the entries updated on and after the distribution time read from the distribution time management table 51 from the storage management table 38a and the link management table 39a as a distribution target. As a result of the process of S16-11, when there is an extracted distribution target ("Yes" in S16-11), the definition distribution unit 33 transmits the distribution target to each distribution node as a distribution definition (entry of the storage management table 38a and the link management table 39a) (S16-2). The process hereinafter is the same as that of FIG. 18.

According to the present embodiment, the process determining unit 32 makes the updated time writable in the storage management table 38a and the link management table 39a. The definition distribution unit 33, in cooperating with the process determining unit 32 which manages the updated time and the distributing time of the entry, makes the distribution definition of the difference between the current distribution and the previous distribution distributable.

<Third Embodiment>

In the third embodiment, explanation is given for selecting a distribution node from among a plurality of distribution nodes which actually performs distribution to the information processing device from a distribution node which belongs to one distribution node adjacent to the information processing device which made a distribution request. In the third embodiment, the same reference numerals are allotted to a similar configuration to that of the first or second embodiment and the explanation thereof is abbreviated.

FIG. 28 illustrates a configuration example of the distribution system in the third embodiment. For example, as illustrated in FIG. 28, the distribution node is defined to be arranged dispersedly in the location of area A and area B. Here, consideration is given where there is a full band frequency in the area but the band frequency between areas A and B is narrow.

For users in the vicinity of area A, as long as such an area is in area A, there is not much difference as to which distribution nodes data are distributed from. In addition, a situation might occur such that the user in the vicinity of area A wants to avoid the distribution from the node in the vicinity of area B as much as possible.

Therefore, in the present embodiment, of a plurality of distribution nodes, the distribution node is selected which actually distributes data from the distribution nodes belonging to the group of a distribution node which is in the vicinity of the information processing device which made a distribution request to the information processing device. Here, the group is set in accordance with the distribution route, communication environment, etc. For example, in the present embodiment, the band frequency between the groups is defined to be narrower than the predetermined threshold value. In addition, any group may be set.

Figure 29:
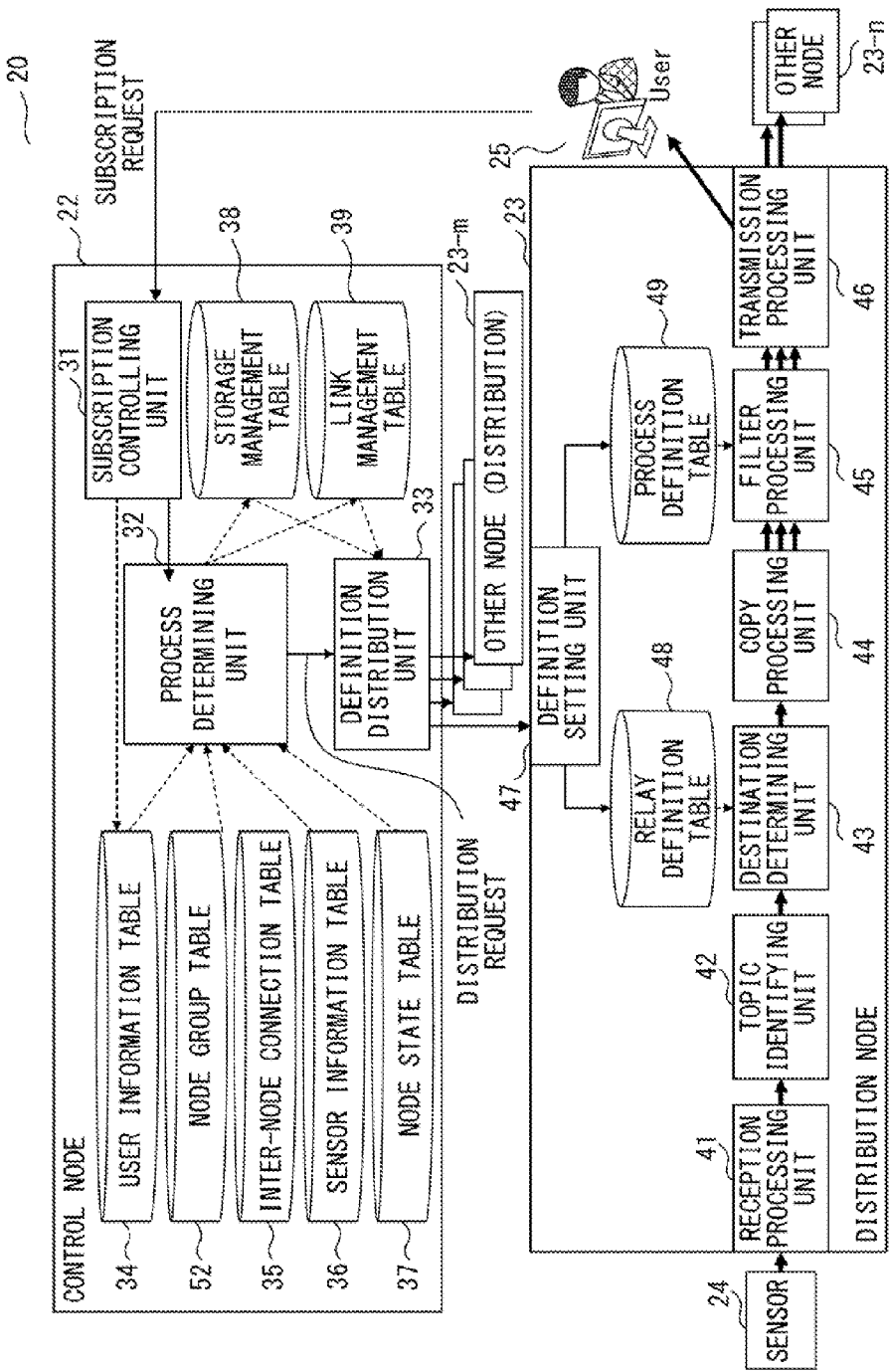
FIG. 29 illustrates a configuration block of a control node and a distribution node in the third embodiment.

FIG. 29 illustrates the configuration block of the control node and the distribution node in the third embodiment. The distribution system 20 in the third embodiment has the node group table 52 added in the control node 22 in the first embodiment. In addition, the inter-node connection table 35b is used so that the predetermined node can be selected preferentially from among the distribution nodes.

FIG. 30 illustrates the configuration example of the node group table in the third embodiment. The node group table 52 includes the data items "group" 52-1 and "node" 52-2. In the "group" 52-1, the identification information which identifies the group is stored. In the "node" 52-2, the identification information which identifies the node belonging to the group is stored.

Figure 31:
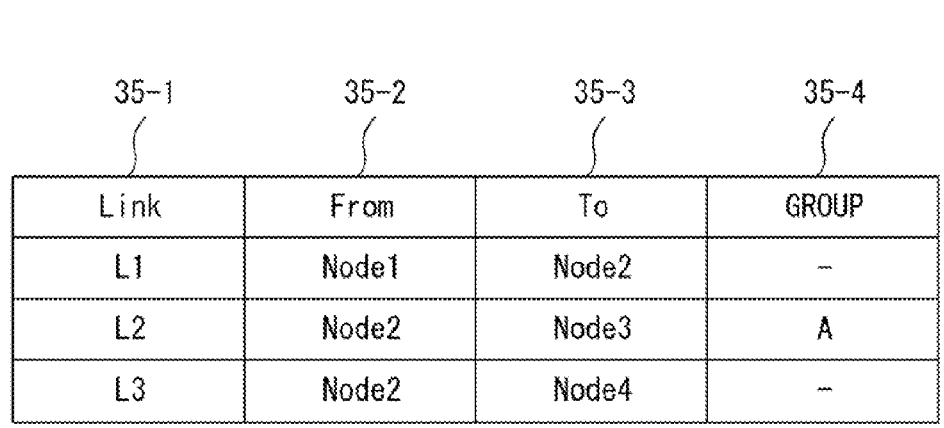
FIG. 31 illustrates a configuration example of an inter-node connection table in the third embodiment.

FIG. 31 illustrates the configuration example of the inter-node connection table in the third embodiment. The inter-node connection table 35b has the data item "group" 35-4 added to the inter-node connection table 35 of FIG. 7. In the "group" 35-4, the identification information which identifies the group to which the link stored in "link" 35-1 belongs is stored.

The process determining unit 32 selects one distribution node of the group of the distribution nodes 23 using the inter-node connection table 52. At this time, the process determining unit 32 preferentially selects the distribution node from the nodes having a user terminal which requests the data type of the same copy target using the inter-node connection table 52 so that unnecessary filtering processes can be avoided.

For example, after the process of the first embodiment has been completed, the user U3 is defined as having newly made a subscription request of the data types D1 and D2. And at this time, for example, the distribution node adjacent to the user terminal 25-3 of the user U3 is Node 1. In addition, as illustrated in the node group table 52 of FIG. 30, Node 1, Node 2, and Node 3 are defined as being in the same group. In this case, the process determining unit 32 refers to the node group table 52, and determines the distribution node from among the Node 1, Node 2, and Node 3.

The process determining unit 32, when it determines the distribution node of the user terminal 25-3 of the user U3 which newly becomes the distribution destination, refers to the link management table 39, and preferentially selects the node in which the data type received by the distribution node and the data type distributed to the user terminal are the same.

When there is no such node in which the data type received by the distribution node and the data type distributed to the user terminal are the same in the link management table 39, the process determining unit 32 performs the following process. That is, the process determining unit 32 refers to the storage management table 38 and preferentially selects the distribution node (to be transmitted) which stores the user distributing the same data type.

Next, explanation is given for the process flow of the control node in the third embodiment. The process flow of the control node in the third embodiment has the process of FIG. 15 changed in the process of the first embodiment (FIGS. 15 to 18).

Figure 32:
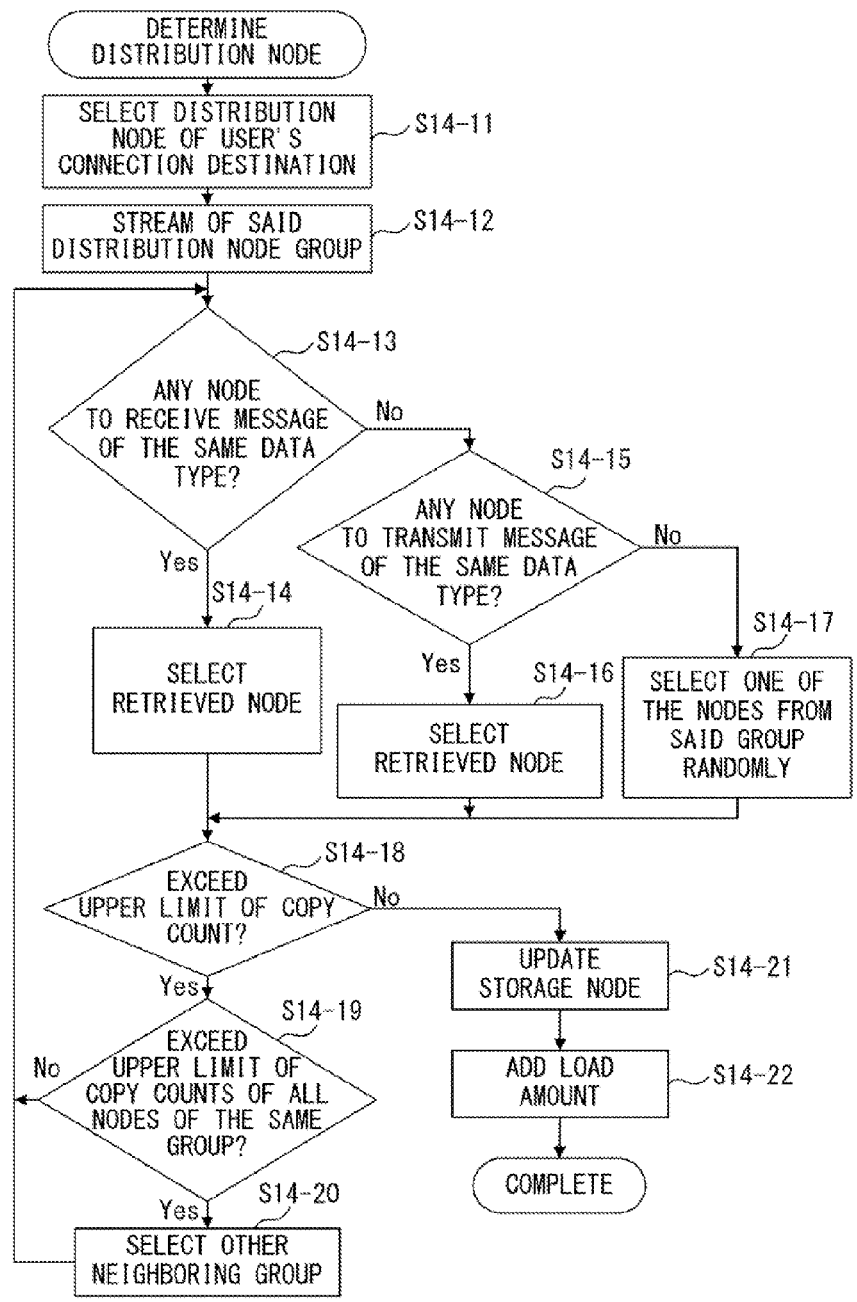
FIG. 32 illustrates a flow of a process of determining a distribution node (S14) of a control node in the third embodiment.

FIG. 32 illustrates the flow of the process of determining the distribution node (S14) of the control node in the third embodiment. The process determining unit 32, upon receiving the report from the subscription controlling unit 31, reads the corresponding entry (User 2, Topic 1, D1, and Node 4) of the user information table 34 and selects the distribution node of the connection destination of the user terminal 25 (S14-11).

The process determining unit 32 reads the distribution node which belongs to the group of the distribution node selected in S14-11 from the node group table 52 (S14-12).

The process determining unit 32 searches for whether or not the data type received by the distribution node and the data type performing distribution to the user terminal 25 of the user which made a subscription request are the same by using the link management table 39 (S14-13).

As a result of the search in S14-13, when there is a node in which the data type received by the distribution node and the data type performing distribution to the user terminal 25 of the user which made the subscription request are the same ("Yes" in S14-13), the process determining unit 32 performs the following process. That is, the process determining unit 32 selects the searched for distribution node (S14-14).

When there is no node in which the data received by the distribution node and the data performing distribution to the user terminal 25 of the user which made a subscription request in the link management table 39 are the same ("No" in S14-13), the process determining unit 32 performs the following process. That is, the process determining unit 32 searches for whether or not there is anode in which the data type transmitted by the distribution node 23 and the data type performing distribution to the user terminal 25 of the user which made subscription request are the same by using the storage management table 38 (S14-15).

As a result of the search in S14-15, when there is a node in which the data type transmitted by the distribution node 23 and the data type performing distribution to the user terminal 25 of the user which made a subscription request in the storage management table 38 are the same, the process determining unit 32 performs the following process. That is, the process determining unit 32 selects the searched distribution node (S14-16).

As a result of the search in S14-15, when there are no nodes in which the data type transmitted by the distribution node 23 and the data type performing distribution to the user terminal 25 of the user which made a subscription request in the storage management table 38 are the same, the process determining unit 32 performs the following process. That is, the process determining unit 32 randomly selects one of the distribution nodes read in S14-12.

The process determining unit 32 refers to the node state table 35 and determines whether the load amount (for example, copy counts) of the distribution node selected in S14-14, S14-16, or S14-17 exceeds the predetermined threshold value (S14-18). Here, predetermined threshold value means the value which is set to be the "allowable processing amount" of the node state table 37.

In S14-18, when it is determined that the load amount of the distribution node exceeds the threshold value ("Yes" in S14-18), the process determining unit 32 performs the following process. That is, the process determining unit 32 determines whether or not the load amount of all the distribution nodes which belong to the distribution node group selected in S14-14, S14-16, or S14-17 exceeds the threshold value (S14-19). When it is determined that the load amount of the distribution node exceeds the threshold value ("Yes" in S14-19) in all of the groups to which the selected distribution belongs, the process determining unit 32 performs the following process. That is, the process determining unit 32 refers to the node group table 52, selects the other group adjacent to said group (S14-20), and goes back to the process of S14-13.

When it is determined that the load amount of the distribution node does not exceed the threshold value ("No" in S14-19) in all the groups to which the selected distribution node belongs, the process determining unit 32 goes back to the process of S14-13.

In S14-18, when it is determined that the load amount of the distribution node does not exceed the threshold value ("No" in S14-18), the process determining unit 32 adds the selected Node No. (Node 4), user ID (User 2), and data type (D1) to the storage management table 38 (S14-21).

In the node state table 35, the process determining unit 32 increases the load amount of the entry which corresponds to the Node No. (Node 4) selected in S14-14, S14-16 or S14-17 by the predetermined value (S19). When the "load amount" is the copy counts, the entry which corresponds to the Node No. (Node 4) is increased by "+1".

According to the present embodiment, the control node selects, from among a plurality of distribution nodes to the information processing device, the distribution node which actually performs distribution from the distribution node belonging to the group of one distribution node adjacent to the information processing device which made a subscription request to the information processing device. In addition, since the control node can preferentially select from the distribution nodes which transmit to the information processing device requesting the same data type, it can save unnecessary filtering process.

<Fourth Embodiment>

In the first embodiment, the load judgment was made on the basis of information such as copy count and the like which can be grasped at the control node side. On the other hand, in the present embodiment, explanation is given for collecting the load information from each distribution node and reflecting the information as a node state. In this way, such a process becomes available based on more precise load information. In the fourth embodiment, the same reference numerals are allotted to a similar configuration to that of the first to third embodiments and the explanation thereof is abbreviated.

Figure 33:
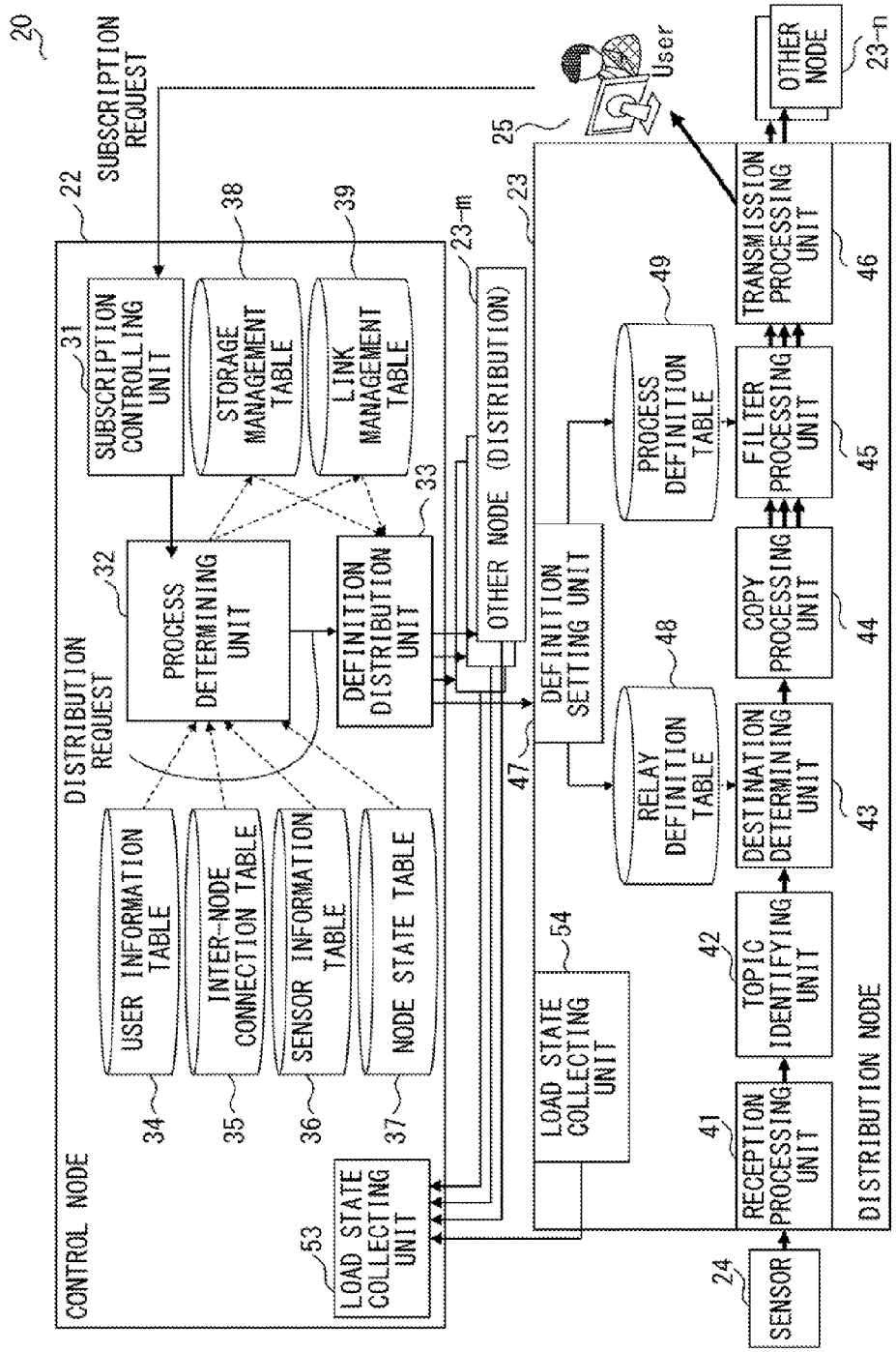
FIG. 33 illustrates a configuration block of a control node and a distribution node in the fourth embodiment.

FIG. 33 illustrates the configuration block of the control node and the distribution node in the fourth embodiment. The distribution system 20 in the fourth embodiment has the load state updating unit 53 added to the control node 22 in the first embodiment and has the load state collecting unit 54 added to the distribution node 23.

The load state collecting unit 54 monitors the resources at the distribution node side and regularly reports the monitoring result to the control node side.

The load state updating unit 53 receives the monitoring result reported from the distribution node and updates the node state table 37. For example, when the CPU load of the distribution node is monitored by the distribution node, the entry content of the node state table 37 may be made to be the utilization rate of the CPU.

FIG. 34 illustrates the configuration example of the node state table in the fourth embodiment. The node state table 37c includes the data items "Node" 37-1, "allowable CPU utilization rate" 37c-2, and "current CPU utilization rate" 37c-3. In the "allowable CPU utilization rate" 37c-2, the allowable CPU utilization rate of the distribution node is stored. In the "current CPU utilization rate" 37c-3, the CPU utilization rate of the distribution node sequentially transmitted from the distribution node is stored.

FIG. 35 illustrates the process flow of the load state collecting unit 54 in the fourth embodiment. The load state collecting unit 54 monitors the resources at the distribution node 23 side (CPU utilization rate) and collects the load information of the distribution node 23 (S51). The load state collecting unit 54 transmits the collected load information (identification information of the node, CPU utilization rate) to the control node 22 (S52). The load state collecting unit 54 repeats the processes of S51 and S52 as required.

Figure 36:
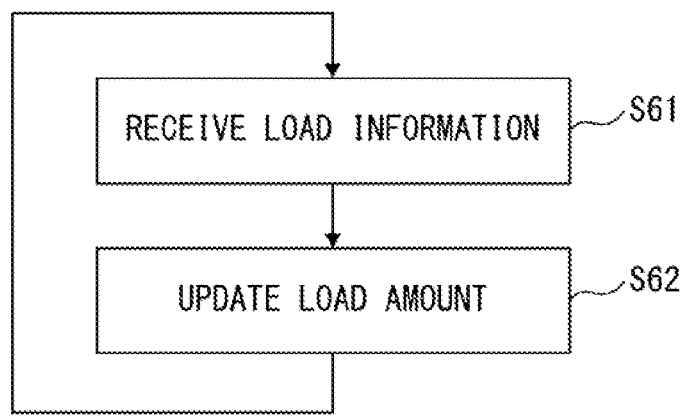
FIG. 36 illustrates a flow of a process of a load state updating unit 53 in the fourth embodiment.

FIG. 36 illustrates the process flow of the load state updating unit 53 in the fourth embodiment. The load state updating unit 53 receives the load information transmitted from the distribution node 23 (S61). The load state updating unit 53 updates the value of the "current CPU utilization rate" 37c-3 of the node state table 37c using the received load information.

FIG. 37 illustrates a total flow example of a control node in the fourth embodiment. Since FIG. 37 has the process of S19 deleted from the flow of FIG. 14, the explanation is abbreviated.

Figure 38:
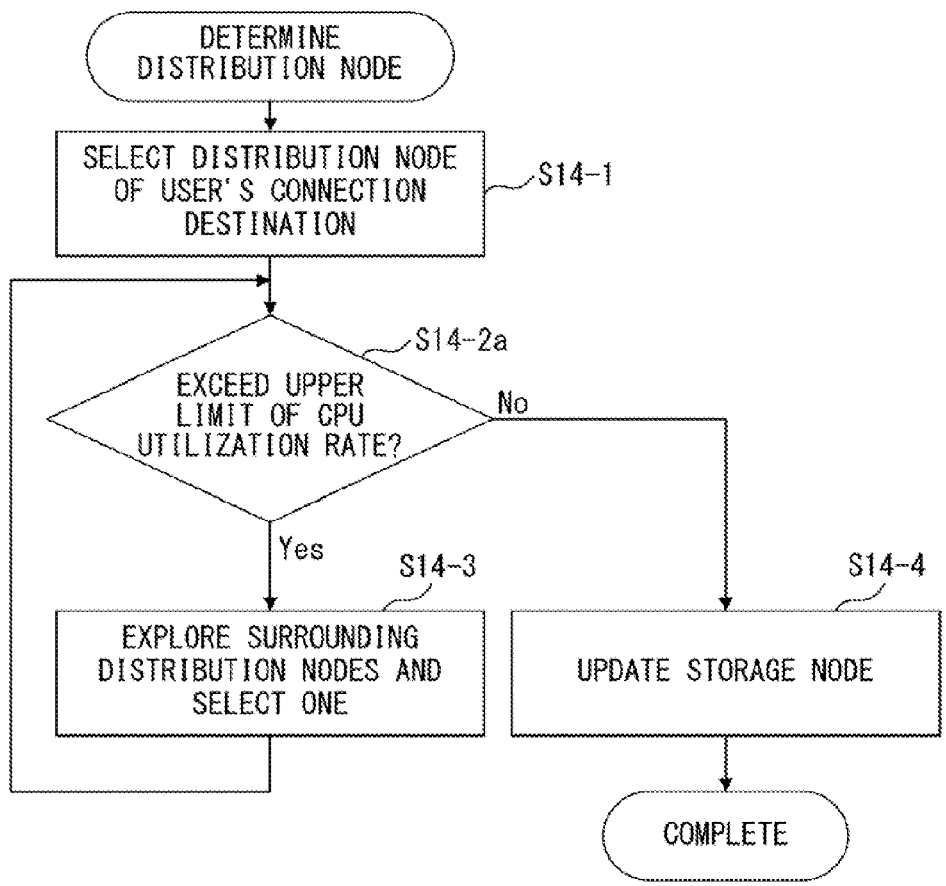
FIG. 38 illustrates a flow of a process of determining a distribution node (S14) of a control node in the fourth embodiment.

FIG. 38 illustrates a flow of a process of determining a distribution node (S14) of a control node in the fourth embodiment. FIG. 38 has S14-2 replaced by 514-2a and with the process of S14-5 deleted in the flow of FIG. 15.

In 514-2a, the process determining unit 32 refers to the node state table 37c and determines whether or not the load amount (current CPU utilization rate) of the node (Node 4) included in the user subscription information exceeds the predetermined threshold value (S14-2). Here, the predetermined threshold value means the value set to the "allowable CPU utilization rate" of the node state table 37c. Hereinafter, the explanation is abbreviated since it is similar to FIG. 15.

According to the present embodiment, the control node can employ the CPU load state of the distribution node in the process of determining the load amount of the distribution node.

In addition, although in the fourth embodiment the monitor target was the CPU load of the distribution node, it is not limited to this and numerical data such as utilization amount of memory and the like, which can be grasped as a resource, may also be employed.

<Fifth Embodiment>

In the fifth embodiment, explanation is given for the process of reviewing the distribution node which actually performs distribution to the user terminal. In the fifth embodiment, the same reference numerals are allotted to the configuration similar to the first to fourth embodiments, and the explanation thereof is abbreviated.

Figure 39:
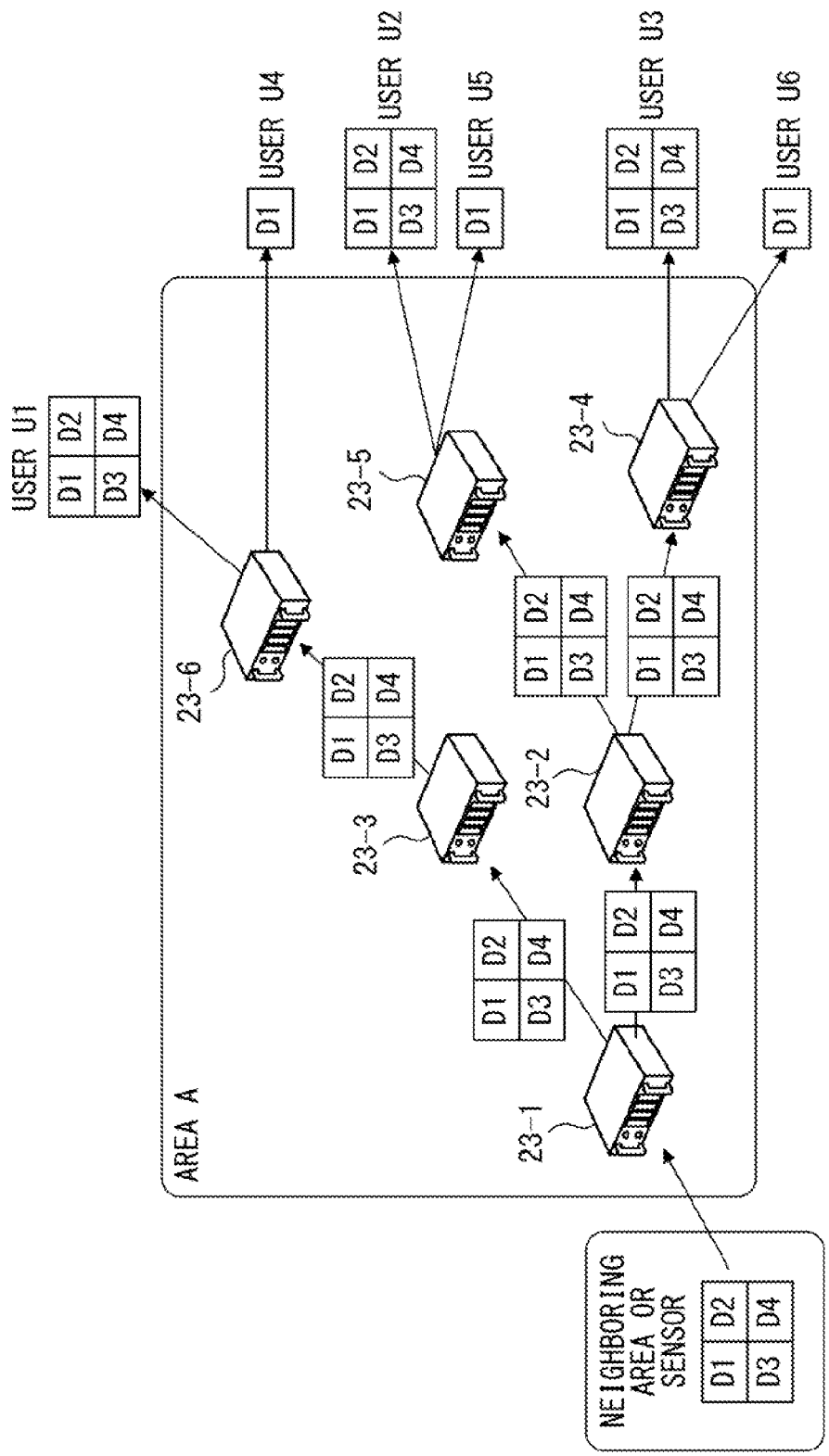
FIG. 39 explains a distribution state before applying the fifth embodiment.

FIG. 39 explains a distribution state before applying the fifth embodiment. As illustrated in FIG. 39, the distribution nodes 23-1 to 23-6 are arranged. Upon the receipt of a subscription request from the user, the addition and deletion of the distribution node is repeated without changing the distribution route to the user already under distribution. Then, it is possible that the data type might be distributed from a different distribution node than the optimum distribution node. Here, the data type might be distributed from a different distribution node than the optimum distribution node when, for example, the users U4, U5, and U6 that want to have only one data type and the users U1, U2, and U3 that want to have all the data types are evenly stored in all the distribution nodes. In this case, as illustrated in FIG. 39, being drawn by the users U1, U2, and U3 wishing to have all the data types, all the data types are distributed in all the communications between the distribution nodes 23-1 to 23-6.

When such a situation comes to pass, the control node 22 executes the process of reviewing the distribution form of the distribution node so as to perform redistribution from the optimal distribution node. For example, it is considered that when 20 subscription requests are received from the user, the process reviews the distribution form of the distribution node once. Also, in accordance with the passage of time, the distribution form of the distribution node may be regularly reviewed, for example at each hour.

FIG. 40 explains a distribution state after applying the fifth embodiment. The distribution form of the distribution node is designed so that the data type may be delivered from the optimum distribution node, since no problems arise when the data type is delivered from a distribution node with the user terminal belonging to the same group. For example, it may be configured to relay more data types for upper nodes and relay fewer data types for terminal nodes.

Therefore, in the fifth embodiment, as illustrated in FIG. 41, an algorithm is used that would allot more data types sequentially from a node located further upstream in the same group in the third embodiment to a user who wishes to have them.

The system configuration of the fifth embodiment is similar to that of the third embodiment (FIG. 29). Of the flow charts of the distribution node, the process added to the third embodiment is illustrated in FIG. 41.

FIG. 41 illustrates a flow of a process of reviewing in the fifth embodiment. The process determining unit 32 selects any group from the node group table 52 (S71).

The process determining unit 32 selects a user whose distribution node is undecided since the reviewing process has not been made by the process of the present flow and a user with many types of subscription request information from the user information table 34 (S72).

Of the distribution tree, the process determining unit 32 selects the uppermost node as a distribution source with room for a load as a distribution source (S73). Here, the process determining unit 32 acquires the "storage node" which corresponds to the user from the storage management table 38 setting the user selected in S72 as a key. The process determining unit 32 refers to the inter-node connection table 35 and searches for the uppermost node of the acquired storage node. The process determining unit 32 refers to the node state table and determines whether or not the load amount of the uppermost node exceeds the predetermined threshold value. Here, predetermined threshold value means the value which is set to be the "allowable processing amount" of the node state table 37. When it is determined that the load amount of the uppermost node does not exceed the predetermined threshold value, the process determining unit 32 selects the uppermost node as the distribution node which actually performs distribution to the user selected in S72.

Next, the process determining unit 32 performs the process of adding data types (S74). The process of adding data types in S74 is similar to the process of S15 explained in FIG. 16.

The process determining unit 32 determines whether or not the distribution source is decided for all the users belonging to the group selected in S71 of the users registered in the user information table 34 (S75). Of the users registered in the user information table 34, when the distribution source is not decided for all the users belonging to the group selected in S71 ("No" in S75), the process determining unit 32 goes back to the process of S72. When the distribution source is decided for all the users belonging to the group selected in S71 ("Yes" in S75), the process determining unit 32 performs the processes of S71 to S75 to all of the groups.

According to the fifth embodiment, the control node can review the storage state of the user in the total distribution system by controlling which node the data type is to be distributed from and to which user terminal without changing the topology between the distribution nodes. Thus, by resetting the distribution form of the distribution node, the data amount flowing on the network can be further reduced.

<Sixth Embodiment>

Although the distribution node which actually distributes to the user terminal may be reviewed in the fifth embodiment, the distribution tree itself is not reviewed. However, when considering the configuration of the physical network, the traffic flowing on the network is considered to be reduced when the distribution node is made into a root of a distribution tree when the users with many data types in their subscription are gathering on the terminal of the distribution tree.

Therefore, in the sixth embodiment, explanation is given for reviewing the logic topology between the distribution nodes. The system configuration of the sixth embodiment is similar to that of the fifth embodiment. In the sixth embodiment, the same reference numerals are allotted to the configurations similar to the first to fifth embodiments and the explanation thereof is abbreviated.

Figure 42:
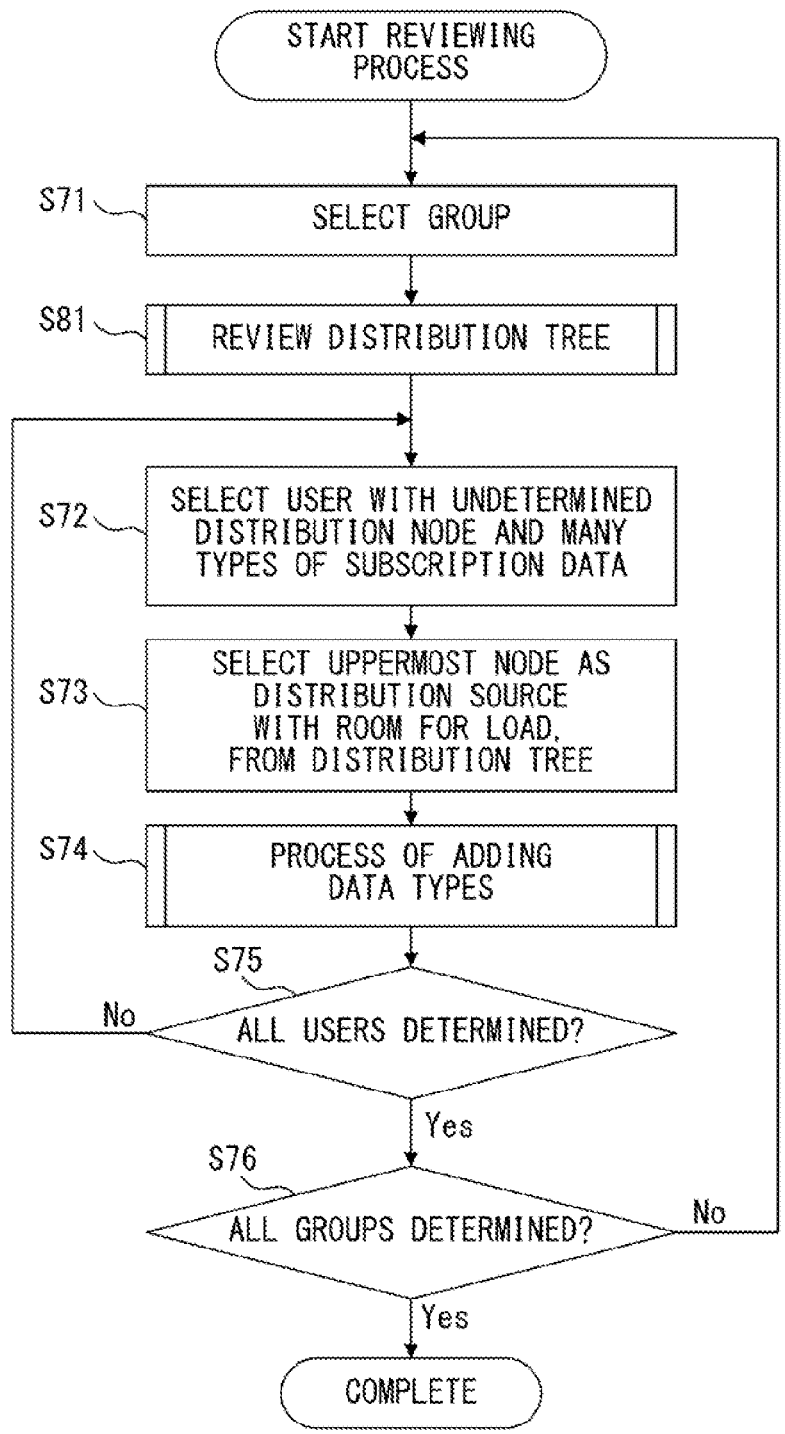
FIG. 42 illustrates a flow of a process of reviewing a logic topology between distribution nodes in the sixth embodiment.

FIG. 42 illustrates a flow of a process of reviewing a logic topology between distribution nodes in the sixth embodiment. The flow of FIG. 42 has the process of reviewing the distribution tree (S81) added to the flow of FIG. 41. In FIG. 42, at the beginning of the process of regular review in the fifth embodiment, the process of reviewing the distribution tree within the group is added, making the distribution node physically close to the user having many data types in their subscription request a root of a distribution tree. Detailed explanation on the process of reviewing the distribution tree (S81) is given in FIG. 43.

Figure 43:
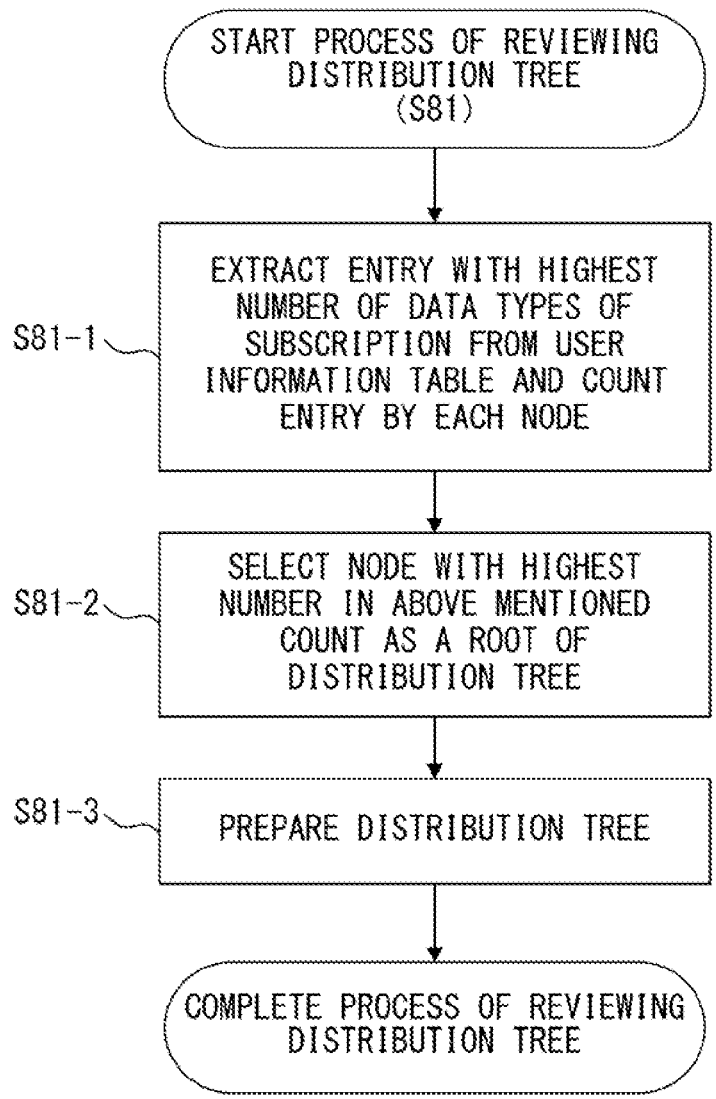
FIG. 43 illustrates a detailed flow of a process of reviewing a distribution tree (S81) in the sixth embodiment.

FIG. 43 illustrates a detailed flow of a process of reviewing a distribution tree (S81) in the sixth embodiment. The process determining unit 32 refers to the user information table 34 and the storage management table 38, and extracts the entry with the highest number of data types in the subscription, and counts the entries for each "storage node" 38-4 (S81-1).

Next, the process determining unit 32 selects the node stored in the "storage node" 38-4 with the highest count in the result of the above mentioned count as a root of a distribution tree (S81-2).

The process determining unit 32 prepares the distribution tree making the selected node a root (S81-3). When the distribution tree is prepared making the selected node a root, the process determining unit 32 may adopt a constructing method of a distribution tree using, for example, a multicast routing protocol or the like. As an example, the process determining unit 32 may prepare a distribution tree making the selected node a rendezvous point. Rendezvous point means a relaying device which becomes the center for sharing a tree when sharing one distribution tree to perform routing of multicast data even when there are a plurality of multicast groups.

According to the present embodiment, since the distribution node which distributes to a user with many data types in their subscription requests can be made into a root of the distribution tree by reviewing the logic topology between the distribution nodes, the traffic flowing on the network can be reduced.

<Seventh Embodiment>

In the seventh embodiment, explanation is given for how to cope with the enlarged distribution system. In the seventh embodiment, the same reference numerals are allotted to configurations similar to the first to sixth embodiments and the explanation thereof is abbreviated.

Figure 44B:
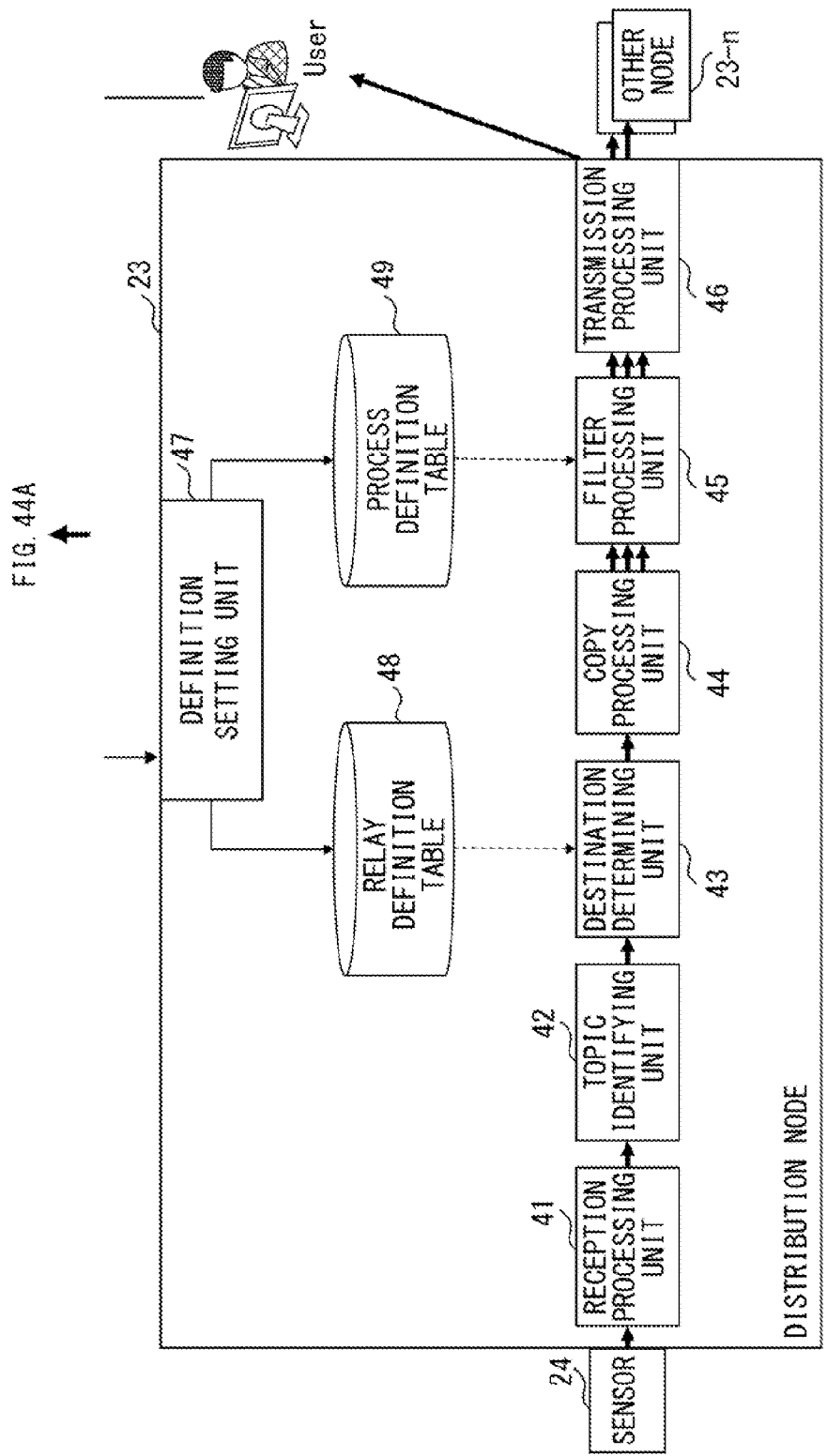

FIGS. 44A and 44B illustrates the configuration block of the control node and the distribution node in the seventh embodiment. The distribution system 20 in the seventh embodiment has the control node linking unit 55 and the control node/distribution node management table 56 added to the control node 22 in the first embodiment.

When the number of distribution nodes greatly increases and when it becomes unable to be controlled with just the single control node 22, a plurality of the control nodes are set and these control nodes perform control in parallel. In this case, each control node has the control node/distribution node management table 56 which has stored the distribution node managed by each of the control nodes. In this way, each control node 22, on the basis of the control node/distribution node management table 56, treats a plurality of distribution nodes managed by each of the control nodes 22 as one domain (distribution node group under management of the same control nodes) and performs distribution control by the domain unit.

The user issues a subscription request to the control node which manages the network to which the user terminal 25 itself belongs, using the user terminal 25. The control node determines a distribution node for the user terminal 25 among distribution nodes under the control node.

When the distribution route covers distribution nodes under control of a plurality of control nodes, it is necessary to adjust the data type to be distributed between the control nodes. Therefore, the control node linking unit 55 adjusts the data type to be distributed between the control nodes when the distribution route covers distribution nodes under control of the plurality of control nodes.

In the process of adding and deleting data types, said control node linking unit 55, when it becomes necessary to change the distribution data of a node which is further upward than the node under its own control, requests that the other control node 22-*n* add and delete the distribution data type.

The control node 22-*n* which receives the adding and deleting request of the distribution data type, on the basis of the requested content, performs the process of adding and deleting the data type and sets the changed content in the distribution node under management.

Figure 45:
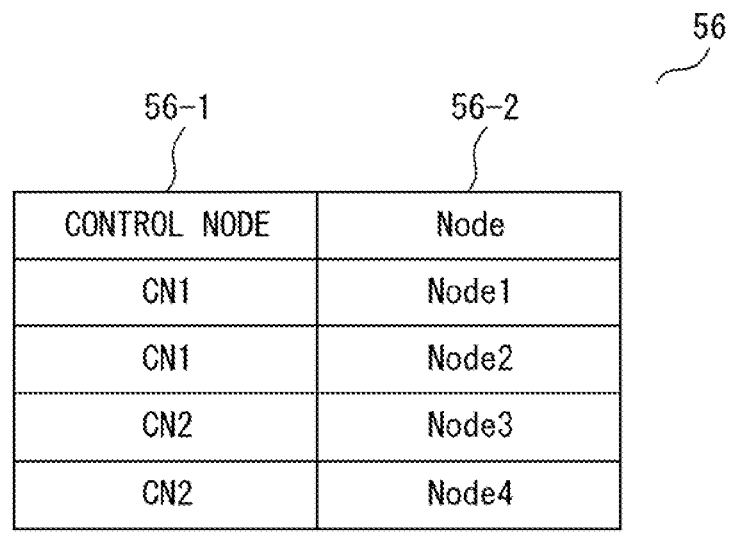
FIG. 45 illustrates a configuration example of a control node/distribution management table in the seventh embodiment.

FIG. 45 illustrates the configuration example of a control node/distribution node management table 56 in the seventh embodiment. The control node/distribution node management table 56 includes the data items "control node" 56-1 and "node" 56-2.

In the "control node" 56-1, the identification information which identifies the control node is stored. In the "node" 56-2, the identification information which identifies the node managed by the control node stored in the "control node" 56-1 is stored.

Figure 46:
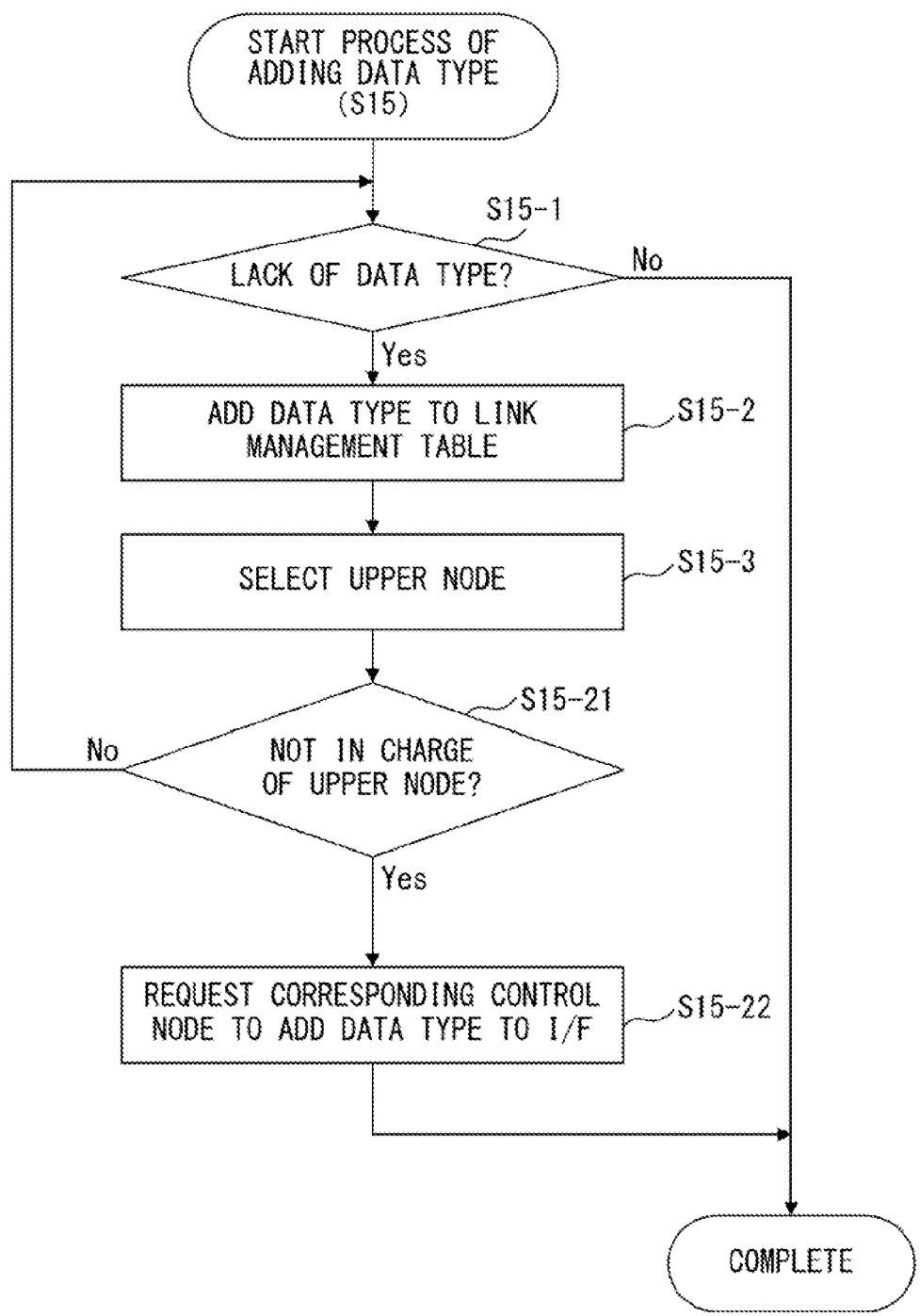
FIG. 46 illustrates a flow of a process of adding data of a control node in the seventh embodiment.

Next, explanation is given for the process flow of the control node in the seventh embodiment. The process flow of the control node in the seventh embodiment has the processes of FIGS. 16 and 17 changed from the process of the first embodiment (FIGS. 15 to 18). For this, explanation is given using FIGS. 46 and 47. FIGS. 46 and 47 are the processes when said control node linking unit 55 requests that the other control node 22-*n* add or delete the distribution data type.

FIG. 46 illustrates a flow of a process of adding data of the control node in the seventh embodiment. FIG. 46 has the processes of S15-21 and S15-22 added to the flow of FIG. 16. Explanation is hereinafter given using the example employed in FIG. 16.

The process determining unit 32 reads the inter-node connection table 35 and specifies the link between a node (storage node) selected in S14-1 or S14-3 (Node 4) and a distribution node whose storage node is a connection destination (Node 2). Then, the process determining unit 32 confirms whether or not the data type (D1) included in the user subscription information is configured to reach the link, using the link management table 39.

To be specific, the process determining unit 32, in the inter-node connection table 35, searches for the entry of the node determined at "To"=S14 (Node 4). The process determining unit 32 acquires the identification information of the link stored in the "link" of the searched for entry (L3) and identification information of the node stored in "From" (Node 2). The process determining unit 32 acquires an entry which includes the identification information of the acquired link (L3) from the link management table 39. The process determining unit 32 confirms as to whether or not the data type (D1) included in the user subscription information is stored in the "data type" of the acquired entry (S15-1). When the data type (D1) included in the user subscription information is stored in the "data type" of the acquired entry ("No" in S15-1), since this means that D1 reaches the Node 4, the flow is completed.

When the data type (D1) included in the user subscription information is not stored in the "data type" of the entry acquired from the link management table 39 ("Yes" in S15-1), since D1 does not reach the storage node (Node 4), the process determining unit 32 performs the following process. That is, the process determining unit 32 stores the data type (D1) included in the user subscription information in "the data type" of the entry acquired from the link management table 39 (S15-2). Then, the process determining unit 32 searches for an upper node (connection source of the link) of the storage node (Node 4) from the inter-node connection table 35 (S15-3) so that D1 is delivered from nodes close to the sensor 24 in turn.

The process determining unit 32 refers to the control node/distributing node management table 56 and determines whether the node searched for in S15-3 is a distribution node which is under management of said control node (S15-21).

When the node searched for in S15-3 is a distribution node which is under management of said control node ("No" in S15-21), the process determining unit 32 goes back to the process of S15-1.

When the node searched for in S15-3 is not a distribution node which is under management of said control node ("Yes" in S15-21), the process determining unit 32 performs the following process. That is, the process determining unit 32 refers to the control node/distribution node management table 56 and specifies the control node which manages the searched for node. The process determining unit 32 requests that the control node linking unit 55 add the data types to the link management table 39 for the specified control node (request to add data type) (S15-22).

FIG. 47 illustrates a flow of a process of deleting data of the control node in the seventh embodiment. FIG. 47 has the processes of S20-21 and S20-22 added to the flow of FIG. 17. Hereinafter, explanation is given using the example employed in FIG. 16.

The process determining unit 32 searches for, from a storage management table 38, the entry with a user ID which conforms to the user ID included in the subscription cancelling information and acquires the identification information of the node stored in the data item "storage node" of the entry. The process determining unit 32, in the inter-node connection table 35, searches for the entry "To"=the acquired node "Node 4". The process determining unit 32 acquires the identification information of the link stored in the "link" of the searched for entry (L3), and the identification information of the node stored in "From" (Node 2). The process determining unit 32 deletes D1 from the link management table 39 when the "D1" is included in the data type of the entry which includes the identification information of the acquired link (L3) ("Yes" in S20-1, S20-2).

The process determining unit 32 refers to the inter-node connection table 35 and searches for the upper node (connection source of the link) of the "Node 4", a node included in the subscription cancelling information (S20-3).

The process determining unit 32 refers to the control node/distributing node management table 56 and determines whether the node searched for in S20-3 is a distribution node under management of said control node.

When the node searched for in S20-3 is a distribution node under management of said control node ("No" in S20-21), the process determining unit 32 goes back to the process of S20-1 (S20-21).

When the node searched for in S20-3 is not a distribution node under management of said control node ("Yes" in S20-21), the process determining unit 32 performs the following process. That is, the process determining unit 32 refers to the control node/distribution node management table 56 and specifies the control node which manages the searched for node. The control node linking unit 55 requests that the specified control node delete the data types from a link management table 39 for the specified control node (request to delete data type) (S20-22).

Next, explanation is given for the process performed at the side of the control node 22-*n* which received the request for adding and deleting the data types transmitted from the control node linking unit 55.

Figure 48:
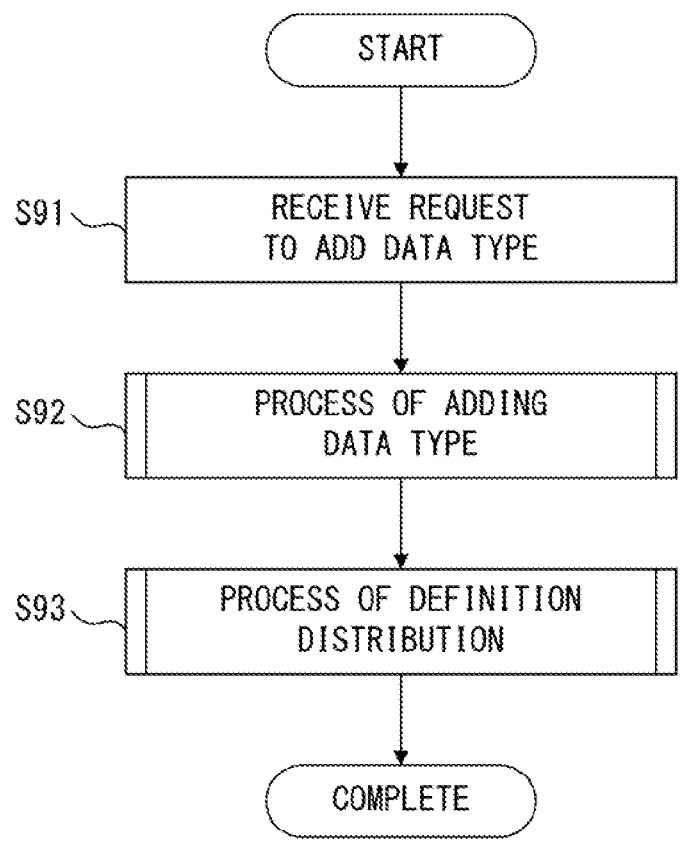
FIG. 48 illustrates a flow of a process of adding data between a plurality of control nodes in the seventh embodiment.

FIG. 48 illustrates the flow of adding the data between a plurality of control nodes in the seventh embodiment. The control node linking unit 55 of the control node 22-*n* receives the request for adding data types transmitted from the control node linking unit 55 of the control node 22 (S91).

The process determining unit 32 of the control node 22-n performs the process of adding data types (S92). The process of adding data types (S92) is similar to the process of S15 in FIG. 14. In the process of adding data types (S15), data types are added to the link management table 39 so that the data type required by the user may be distributed to the distribution node selected in S15-3. Subsequently, the process determining unit 32 of the control node 22-n requests that the definition distribution unit 33 of the control node 22-n distribute the distribution definition information of the data types.

The definition distribution unit 33 of the control node 22-n, upon receiving the distribution request from the process determining unit 32, refers to the control node/distribution node management table 56 and distributes the distribution definition information to each of the self-managing distribution nodes 23 (S93). The distribution definition distribution process (S93) is similar to the process of S16 in FIG. 14.

FIG. 49 illustrates a flow of deleting data between a plurality of control nodes in the seventh embodiment. The control node linking unit 55 of the control node 22-n receives the request to delete the data types transmitted from the control node linking unit 55 of the control node 22 (S101).

The process determining unit 32 of the control node 22-n performs the process of deleting data types (S102). The process of deleting data types (S102) is similar to the process of S15 in FIG. 14. In the process of deleting data types (S102), the data types are deleted from the link management table 39 so that the data types whose subscription is cancelled may not be unnecessarily distributed to the distribution node. Subsequently, the process determining unit 32 requests that the definition distribution unit 33 distribute the distribution definition information of the data types.

The definition distribution unit 33, upon receiving the distribution request from a process determining unit 32, distributes distribution definition information to each distribution node 23 (S103). The process of a distribution definition distribution process (S103) is similar to the process of S16 in FIG. 14.

According to the present embodiment, between the control nodes, when the node which can distribute the data type with the subscription request from the user or the node which can stop distributing the data type with the subscription cancelling request from the user is not under the management of the control node, each control node can deliver the changed content to the other control node. Therefore, by separating the distribution node to a domain and by making the control node operable in parallel, data can be distributed even when the scale of the system is enlarged.

According to the first to seventh embodiments, the data types required at the distribution destination are set in each node beforehand, and when each node receives data, on the basis of the set information, only the data types required at the distribution destination are forwarded, and thereby the data amount forwarded between distribution nodes can be reduced.

Figure 50:
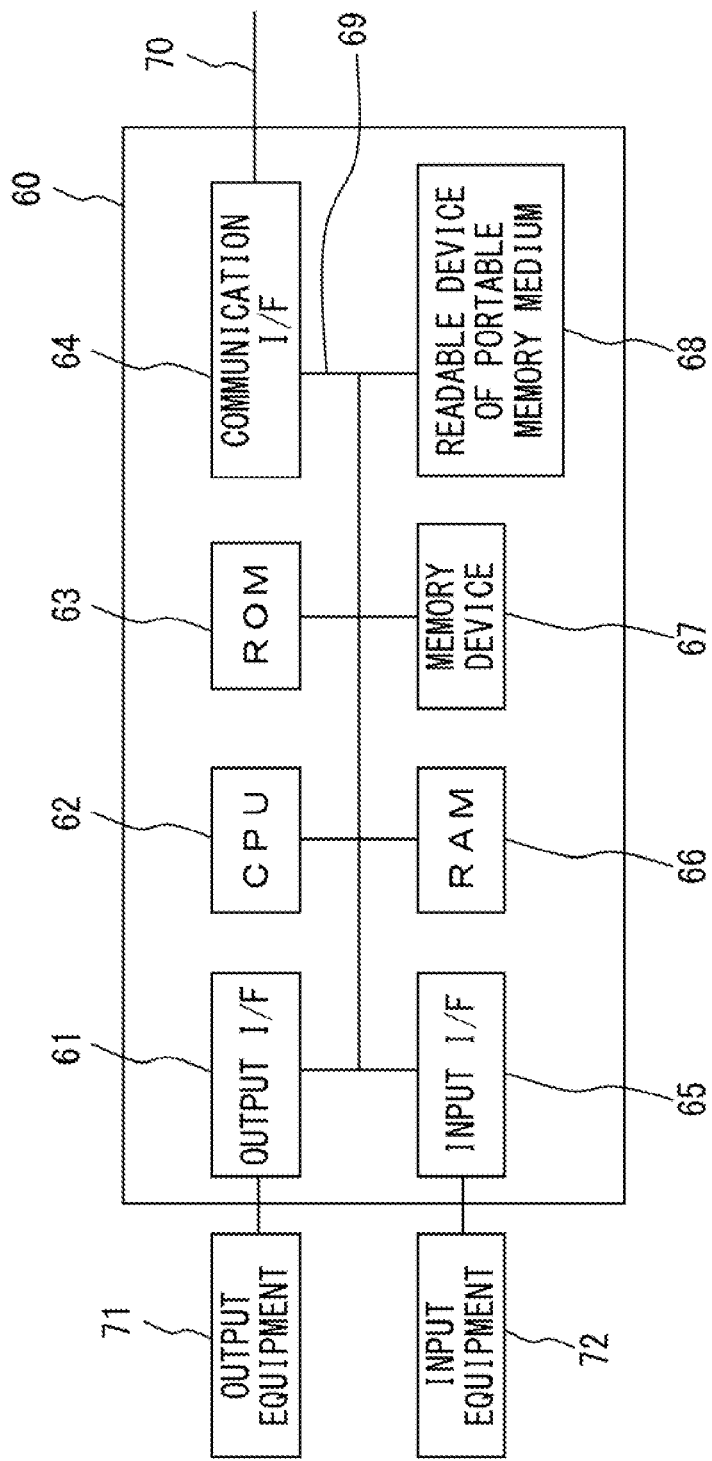
FIG. 50 illustrates a configuration block diagram of a hardware environment of a computer.

FIG. 50 is a configuration block diagram of a hardware environment of a computer. The computer 60 is a server 21, a control node 22, a distribution node 23, or a user terminal 25. The computer 60 is formed from a CPU 62, a ROM 63, a RAM 66, a communication I/F 64, a memory device 67, an output I/F 61, an input I/F 65, a readable device 68, a bus 69, a piece of output equipment 71, and a piece of input equipment 72.

Here, the CPU represents a central processing unit and is one example of a processor. The ROM represents a read only memory. The RAM represents random access memory. The I/F represents an interface. The CPU 62, the ROM 63, the RAM 66, the communication I/F 64, the memory device 67, the output I/F 61, the input I/F 65, and the readable device 68 are connected with the bus 69. The readable device 68 is a device which reads a portable memory medium. The output equipment 71 is connected with the output I/F 61. The input equipment 72 is connected with the input I/F 65.

As the memory device 67, a memory device with a various kinds of formats can be used, including a hard disc device, a flash memory device, a magnetic disc device, etc. When the computer 60 is a control node 22, a program which controls the operation of the entire control node 22 and the program related to the present embodiment are stored in the memory device 67 or the ROM 63. The CPU 62, by reading the program related to the present embodiment from the memory device 67 or the ROM 63, functions as a subscription controlling unit 31, a process determining unit 32, a definition distribution unit 33, a load state updating unit 53, and a control node linking unit 55.

When the computer 60 is a control node 22, the memory 67 or the ROM 63 includes a user information table 34, an inter-node connection table 35, a sensor information table 36, a node state table 37, a storage management table 38, and a link management table 39. In addition, the memory device 67 or the ROM 63 includes a distribution time management table 51, a node group table 52, and a control node/distribution node management table 56.

When the computer 60 is a distribution node 23, a program which controls the operation of the entire distribution node 23 and a program related to the present embodiment are stored in the memory device 67 or the ROM 63. The CPU 62, by reading the program related to the present embodiment from the memory device 67 or the ROM 63, functions as a reception processing unit 41, a topic identifying unit 42, an destination determining unit 43, a copy processing unit 44, a filter processing unit 45, a transmission processing unit 46, and a definition setting unit 47. The CPU 62, by reading the program related to the present embodiment from the memory device 67 or the ROM 63, further functions as a load state collecting unit 54.

Further, when the computer 60 is a distribution node 23, the memory device 67 or the ROM 63 includes a relay definition table 48 and a process definition table 49.

The program which realizes the process explained in the above mentioned embodiments may be stored, for example, in the memory device 67 from the program provider side via a communication network 70 and a communication I/F 64. In addition, the program which realizes the process explained in the above mentioned embodiments may be stored in a commercially available and distributable portable memory medium. In this case, this portable memory medium may be set in the readable device 68, the program being read by the CPU 62, and executed. As the portable memory medium, a memory medium with various formats may be used, including a CD-ROM, a flexible disc, an optical disc, a magnetic optical disc, an IC card, a USB memory device, etc. Programs stored in such a medium are read by the readable device 68.

In addition, a keyboard, a mouse, an electronic camera, a web camera, a microphone, a scanner, a sensor, a tablet, etc. can be used for the input equipment 72. Further, a display device, a printer, a speaker, etc can be used for the output equipment 71. Moreover, the network 70 may be a communication network including the Internet, LAN (Local Area Network), WAN (Wide Area Network), an exclusive line, a wired line, a wireless line, etc.

In addition, the present invention is not limited to the embodiments stated so far above, and can take the form of various configurations and embodiments within a range not departing from the gist of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A distribution system comprising:
    a plurality of distribution nodes that distribute data; and
    a control node that is connected to the plurality of distribution nodes via a network and controls the plurality of distribution nodes,
    wherein the control node includes:
        a processor to perform processes including:
            determining, for each of the plurality of distribution nodes, the distribution node of a subsequent distribution destination to which one of the plurality of distribution nodes distributes data and a data type distributed to the distribution node of the distribution destination on the basis of connection information indicating a connection state between the distribution nodes and load information in the distribution node when receiving a distribution request which requests distribution of at least a piece of data type of which distribution is desired; and
            distributing node information which specifies the determined distribution node of the distribution destination and type information which specifies the determined data type to each of the distribution nodes that is a distribution source distributing the determined distribution destination, and
    wherein each of the distribution nodes includes:
        a processor to perform processes including:
            receiving the node information and the type information distributed from the control node;
            selecting data of the type specified by the type information from the received data when receiving the data distributed from other distribution node; and
            transmitting the selected data of the type to the distribution node specified by the node information.

2. The distribution system according to claim 1, wherein the determining extracts distribution nodes which belong to the group to which the distribution nodes belong which were set beforehand as distribution nodes distributing to the information processing terminal from node group information associating the distribution node with the group when the distribution node is classified into a group, and determines the terminal distribution node from the extracted distribution nodes.

3. The distribution system according to claim 1, wherein the determining selects, as the terminal distribution node, the distribution node which transmits or receives the data of the type which is a target of the distribution request, from among the distribution nodes.

4. The distribution system according to claim 1, wherein the determining measures copy counts of the data received by the distribution node as the load information, and determines the terminal distribution node, in accordance with the copy counts from the distribution nodes distributable to the information processing terminal.

5. The distribution system according to claim 1, wherein
    the processor of the distribution node further performs processes including:
        detecting a utilization rate of a piece of operational equipment provided in the distribution node; and
        transmitting the detected utilization rate of the operational equipment to the control node; and
    the processor of the control node further performs a process including:
        updating the load information using the utilization rate of the operational equipment received from the distribution node.

6. The distribution system according to claim 1, wherein the determining acquires the distribution node of the distribution destination determined by the distribution request and the type of data distributed to distribution node of the distribution destination after distribution of the node information of the distribution destination and the type information which specifies the data type, and the distributing distributes the node information which specifies the distribution node of the distribution destination and the type information which specifies the acquired data type to the distribution node.

7. The distribution system according to claim 1, wherein the determining determines a terminal distribution node for an information processing terminal to which the distribution request with many data types included in the received distribution request was transmitted as an uppermost distribution node in a distribution tree, which is a distribution route for distributing data and is represented by a tree construction.

8. The distribution system according to claim 1, wherein the determining measures a number of the distribution requests which includes the highest number of data types of the received distribution requests for each terminal distribution node, and determines the terminal distribution node with the highest number of distribution requests measured as a route of a distribution tree, which is a distribution route for distributing data and is represented by a tree construction.

9. The distribution system according to claim 1, wherein the processor of the control node further performs a process including:
    communicating between other control nodes when there is a plurality of control nodes and when there is a plurality of distribution nodes under management of each control node, and wherein
    when any one of the control nodes receives the distribution request, the determining in the processor of the control node which receives the distribution request selects, on the basis of the connection information between the plurality of distribution nodes and the load information in each of the plurality of distribution nodes, the distribution node of the distribution destination to which one of the plurality of distribution nodes subsequently distributes the data, and determines, on the basis of the information which specifies the distribution node under management of each control node, which control node the selected distribution node is under management of, and
    when the selected distribution node is determined not the distribution node under management of any control node, the communicating requests the other control node to send data of the type of a target of the distribution request from any of the distribution nodes under management of the other control node to the terminal distribution node for the information processing device which made the distribution request.

10. A distribution method of distribution system including a plurality of distribution nodes that distribute data and a control node that is connected to the plurality of distribution nodes via a network and controls the plurality of distribution nodes, the method comprising:
  determining, for each of the plurality of distribution nodes, on the basis of connection information indicating a connection state between the distribution nodes and load information in the distribution node, the distribution node of a subsequent distribution destination to which one of the plurality of distribution nodes distributes the data and the data type distributed to the distribution node of the distribution destination by each of the control nodes when receiving a distribution request which requests distribution of at least a piece of data type of which distribution is desired;
  distributing node information which specifies the determined distribution node of the distribution destination and type information which specifies the determined data type to each of the distribution nodes that is a distribution source distributing the determined distribution destination by the control node;
  receiving the node information and the type information distributed from the control node by each of the distribution nodes;
  selecting the data of the type specified by the type information from the received data by the distribution node when the data distributed from the other distribution node is received; and
  transmitting the selected data of the type to the distribution node specified by the node information by the distribution node.

11. The distribution method according to claim 10, wherein the control node, when the distribution node is classified into a group, extracts, from node group information associating the distribution node with the group, the distribution nodes which belong to a group to which the distribution nodes belong, which were set beforehand as distribution nodes distributing to the information processing terminal, and determines the terminal distribution node of the extracted distribution nodes.

12. The distribution method according to claim 10, wherein the control node selects, as the terminal distribution node, the distribution node which transmits or receives data of a type of a target of the distribution request, from among the distribution nodes.

13. The distribution method according to claim 10, wherein the control node measures copy counts of the data received by the distribution node as the load information, and determines the terminal distribution node, in accordance with the copy counts, from among the distribution nodes distributable to the information processing terminal.

14. A non-transitory computer-readable recording medium having stored therein a program for causing a processor of a control node of a distribution system including a plurality of distribution nodes that distribute data and a control node that is connected to the plurality of distribution nodes via a network and controls the plurality of distribution nodes to execute a digital signature process comprising:
  determining, for each of the plurality of distribution nodes, on the basis of connection information indicating a connection state between the distribution nodes and load information in a distribution node, a distribution node of a subsequent distribution destination to which one of the plurality of distribution nodes distributes the data and a data type distributed to the distribution node of the distribution destination when receiving a distribution request which requests distribution of at least a piece of data type of which distribution is desired, and
  distributing the node information which specifies the determined distribution node of the distribution destination and the type information which specifies the determined data type to each of the distribution nodes that is a distribution source distributing the determined distribution destination.

15. The non-transitory computer-readable recording medium according to claim 14, wherein the determining extracts the distribution nodes which belong to a group to which the distribution nodes belong which were set beforehand as distribution nodes distributing to the information processing terminal from node group information associating the distribution node with the group when the distribution node is classified into a group, and determines the terminal distribution node from among the extracted distribution nodes.

16. The distribution system according to claim 1, wherein the determining includes referring to an acquisition table that associates the data type with the distribution node that acquires the data, the connection information indicating a connection state between distribution nodes, the load information in the distribution node, and information about a distribution node in a neighborhood of an information processing terminal that transmits the distribution request, and determining a route from a distribution node that acquires at least a data type of which distribution is desired to the distribution node in the neighborhood of the information processing terminal and a data type distributed between distribution nodes in the route.

17. The distribution method according to claim 10, wherein the determining includes referring to an acquisition table that associates the data type with the distribution node that acquires the data, the connection information indicating a connection state between distribution nodes, the load information in the distribution node, and information about a distribution node in a neighborhood of an information processing terminal that transmits the distribution request, and determining a route from a distribution node that acquires at least a data type of which distribution is desired to the distribution node in the neighborhood of the information processing terminal and a data type distributed between distribution nodes in the route.

18. The non-transitory computer-readable recording medium according to claim 14, wherein
  the determining includes referring to an acquisition table that associates the data type with the distribution node that acquires the data, the connection information indicating a connection state between distribution nodes, the load information in the distribution node, and information about a distribution node in a neighborhood of an information processing terminal that transmits the distribution request, and determining a route from a distribution node that acquires at least a data type of which distribution is desired to the distribution node in the neighborhood of the information processing terminal and a data type distributed between distribution nodes in the route.

* * * * *